(12) United States Patent
Tamaki et al.

(10) Patent No.: US 8,547,218 B2
(45) Date of Patent: Oct. 1, 2013

(54) VEHICLE APPROACH NOTIFICATION CONTROL APPARATUS FOR ELECTRIC MOTORCYCLE

(75) Inventors: Kenji Tamaki, Saitama (JP); Ryuji Akiba, Saitama (JP); Kazuhiko Tanaka, Saitama (JP); Takeshi Konno, Saitama (JP)

(73) Assignee: Honda Motor, Co., Ltd., Tokyo (JP)

( * ) Notice: Subject to any disclaimer, the term of this patent is extended or adjusted under 35 U.S.C. 154(b) by 184 days.

(21) Appl. No.: 13/246,607

(22) Filed: Sep. 27, 2011

(65) Prior Publication Data

US 2012/0081222 A1    Apr. 5, 2012

(30) Foreign Application Priority Data

Sep. 30, 2010    (JP) ................................. 2010-221601

(51) Int. Cl.
   *B60Q 1/54*    (2006.01)

(52) U.S. Cl.
   USPC ..................... 340/466; 340/384.1; 340/425.5; 340/435; 340/474; 381/86

(58) Field of Classification Search
   USPC .................. 340/466, 384.1, 425.5, 435, 474; 381/86
   See application file for complete search history.

(56) References Cited

U.S. PATENT DOCUMENTS

| 8,204,243 B2* | 6/2012 | Smith | 381/86 |
| 2010/0166210 A1* | 7/2010 | Isozaki | 381/86 |
| 2010/0326402 A1* | 12/2010 | Fujikawa | 123/399 |

FOREIGN PATENT DOCUMENTS

JP    07/182587    7/1995

* cited by examiner

*Primary Examiner* — Tai T Nguyen
(74) *Attorney, Agent, or Firm* — Birch, Stewart, Kolasch & Birch, LLP

(57) ABSTRACT

To provide a vehicle approach notification control apparatus for an electric motorcycle, which can output notification sound for notifying a walker or the like of approach of an electric motorcycle with an appropriate sound volume. The vehicle approach notification control apparatus for an electric motorcycle includes a speaker for generating notification sound equivalent to engine sound of an engine driven motorcycle of a vehicle category that is the same as a vehicle category of the electric motorcycle in response to a motor speed of an electric motor or a vehicle speed. The vehicle approach notification control apparatus includes a pseudo engine sound volume storage device configured to store sound volume data of engine sound with respect to the entire running sound upon running of the engine driven vehicle, and a control unit for controlling the notification sound.

16 Claims, 27 Drawing Sheets

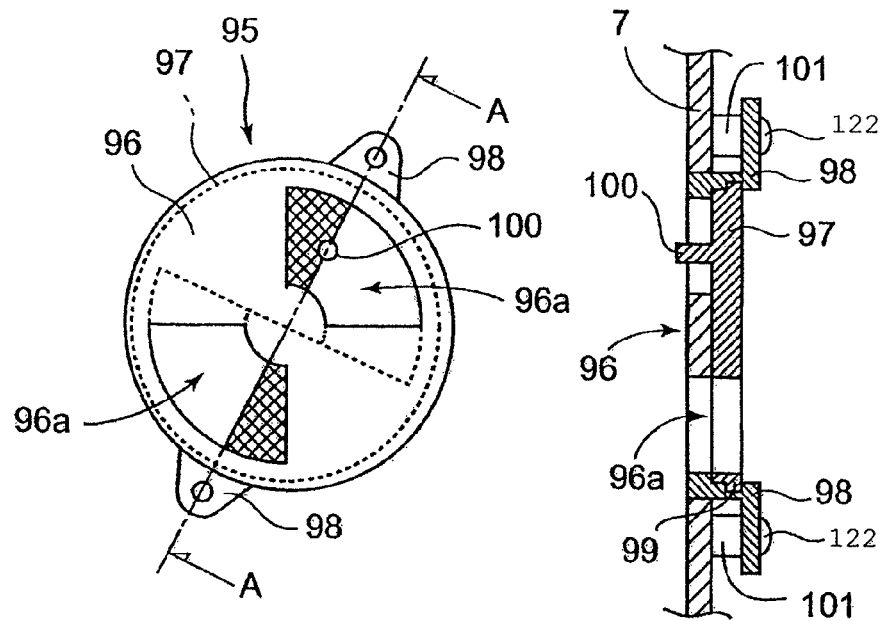
FIG. 8(a)  FIG. 8(b)

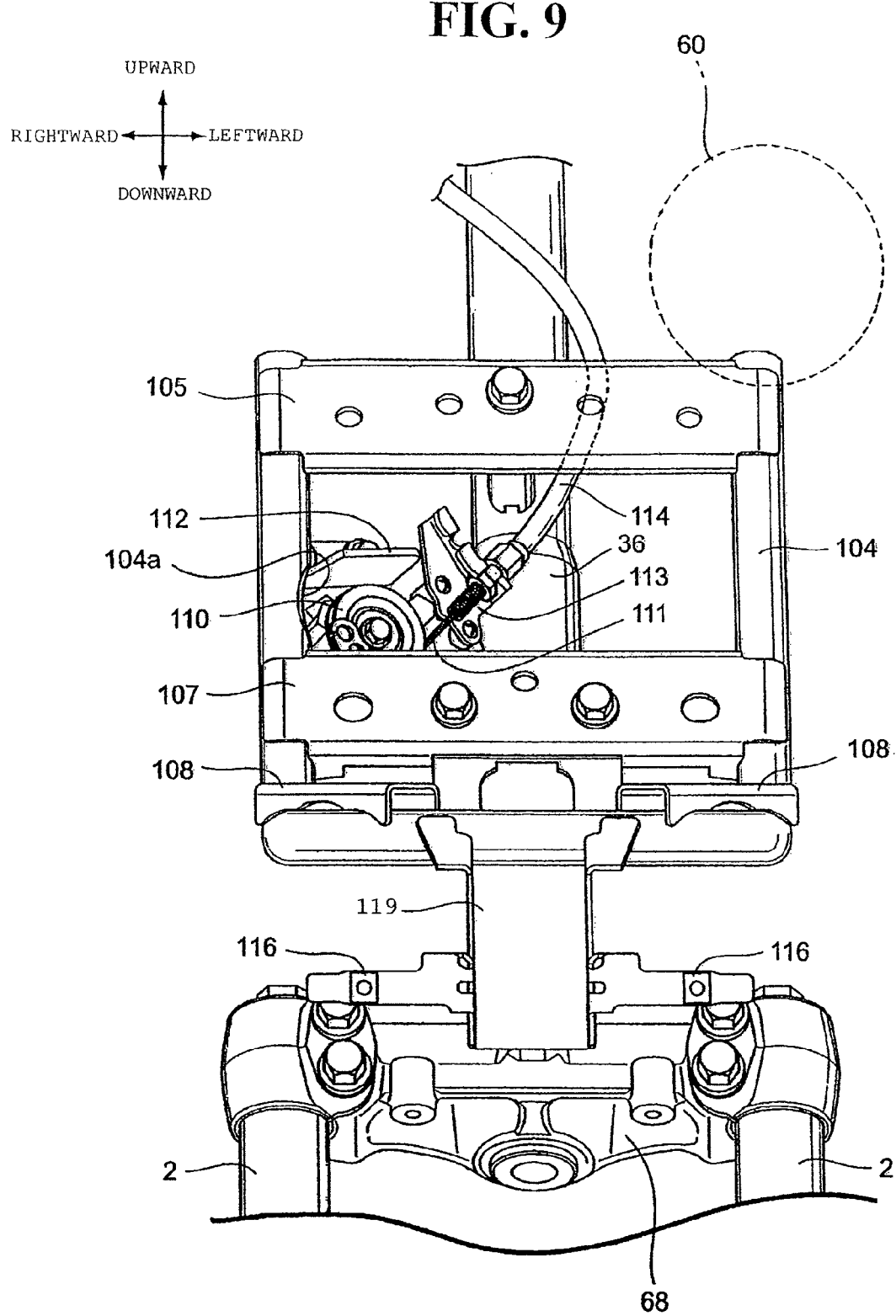

VEHICLE APPROACH NOTIFICATION CONTROL APPARATUS FOR ELECTRIC MOTORCYCLE

CROSS-REFERENCE TO RELATED APPLICATIONS

This application claims priority under 35 U.S.C. §119(a) to Application No. 2010-221601, filed in Japan on Sep. 30, 2010. The entirety of the above-identified application is expressly incorporated herein by reference.

BACKGROUND OF THE INVENTION

1. Field of the Invention

The present invention relates to a vehicle approach notification control apparatus for an electric motorcycle. More particularly, the present invention relates to a vehicle approach notification control apparatus for an electric motorcycle, which issues a notification sound for notifying a walker or the like of approach of an electric motorcycle.

2. Description of Background Art

In recent years, in an electric vehicle or a hybrid vehicle whose development is proceeding, since the driving sound when the vehicle is driven to run by an electric motor is weak in comparison with the driving sound of an engine driven vehicle, a walker or the like is less likely to recognize approach of the vehicle. Thus, an appropriate countermeasure against this fact is demanded.

In Japanese Patent Laid-Open No. Hei 7-182587, a vehicle approach notification control apparatus, which outputs engine sound recorded from an actual engine driven vehicle as a notification sound from a speaker is attached to a vehicle body of an electric vehicle. Therefore, a walker or the like is notified of approach of a vehicle. The vehicle approach notification control apparatus according to Japanese Patent Laid-Open No. Hei 7-182587 is configured such that the volume of the notification sound is varied based on motor speed (vehicle speed) information and acceleration opening information.

SUMMARY OF THE INVENTION

Incidentally, regarding the application of a vehicle approach notification control apparatus, while an effect of the apparatus is anticipated particularly when a vehicle runs at a low speed, in a four-wheeled vehicle in which the total stroke volume is great and the engine speed upon low-speed running is low, the influence of engine sound is low in comparison with the running sound by a tire and so forth. Therefore, no problem occurs if the notification sound equivalent to engine sound of an engine driven vehicle is generated.

On the other hand, in a two-wheeled vehicle, since the total stroke volume is small, the engine speed is high also upon low-speed running and the engine is exposed to the outside of the vehicle body, the influence of engine sound upon low-speed running is higher than that of a four-wheeled vehicle. However, in the ratio of the sound volume in the entire running sound, the running sound by a tire and so forth increases rather than engine sound as the vehicle speed increases. Therefore, with a method wherein speaker notification sound is increased as the vehicle speed increases, there is the possibility that notification sound may become excessively great.

It is an object of the present invention to solve the object of the background art described above and provide a vehicle approach notification control apparatus for an electric motorcycle, which can output notification sound for notifying a walker or the like of approach of an electric motorcycle with an appropriate sound volume.

In order to achieve the object described above, according to a first aspect, a vehicle approach notification control apparatus for an electric motorcycle (1) includes sound generation means (60) for generating a notification sound that is equivalent to the engine sound of an engine driven motorcycle of a vehicle category that is the same as a vehicle category of the electric motorcycle (1), in response to a motor speed (Nm) of an electric motor (M) or a vehicle speed (V). The vehicle approach notification control apparatus includes pseudo engine sound volume storage means (251) for storing sound volume data of engine sound with respect to an entire running sound upon running of the engine driven vehicle, and the sound generation means (60) is controlled based on the sound volume data stored in the pseudo engine sound volume storage means (251) upon low speed running of the electric motorcycle (1).

Further, according to a second aspect of the present invention, the pseudo engine sound volume data is set so that the sound volume decreases in response to an increase of the vehicle speed (V), and becomes zero when a predetermined vehicle speed (VL) is reached.

Further, according to a third aspect of the present invention, the electric motorcycle (1) includes a centrifugal clutch (216) provided on a driving route for driving a driving wheel (WR) from the electric motor (M), and the vehicle approach notification control apparatus controls the sound generation means (60) in response to the motor speed (Nm) in a state in which the vehicle speed (V) is in the proximity of zero before the speed (Nm) of the electric motor (M) reaches a connection speed of the centrifugal clutch (216).

Further, according to a fourth aspect of the present invention, the pseudo engine sound volume data is set so as to correspond to the engine sound of a maximum total stroke volume of an engine driven vehicle of a vehicle category that is the same as the vehicle category into which the electric motorcycle (1) falls.

Further, according to a fifth aspect of the present invention, the vehicle approach notification control apparatus further includes a raindrop sensor (257) for detecting a rain amount and an illuminance sensor (258) for detecting brightness, and the vehicle approach notification control apparatus carries out, in the case where a rainfall state is detected by the raindrop sensor (257), correction for increasing the sound volume of the sound generation means (60), but carries out, in the case where it is detected by the illuminance sensor (258) that it is nighttime, correction for decreasing the sound volume of the sound generation means (60).

Further, according to a sixth aspect of the present invention, the vehicle approach notification control apparatus further includes a control unit (80) for controlling the notification sound, and the control unit (80) is connected to a horn switch (133) provided on a handle cover (8) which covers a steering handle member (9) of the electric motorcycle (1) and causes, if a switching on operation of the horn switch (133) is detected, the sound generation means (60) to generate horn sound.

Further, according to a seventh aspect of the present invention, the sound generation means (60) is a speaker provided on the vehicle body rear side of a front cover (7) which covers a head pipe (36) of a vehicle body frame (34) of the electric motorcycle (1) from the front, and the control unit (80) is disposed in the proximity of the speaker on the vehicle body rear side of the front cover (7).

Further, according to an eighth aspect of the present invention, the vehicle approach notification control apparatus further includes a control unit (80) for controlling the notification sound, and the control unit (80) is disposed on the inner side of the handle cover (8), which covers the steering handle member (9) of the electric motorcycle (1), and in the proximity of a right side handle grip (9a) attached to one end portion of a handle bar (135) of the steering handle member (9) at a lower portion of the handle bar (135).

Further, according to a ninth aspect of the present invention, the vehicle approach notification control apparatus further includes a notification sound switch (118) for switching the operation of the control unit (80) on or off, the notification sound switch (118) is configured integrally with the speaker (60), and an operation element for operating the notification sound switch (118) so as to be projected and retracted is configured so as to be exposed rearwardly of the vehicle body from a through-hole formed in a leg shield (10), which covers the vehicle body rear side of the head pipe (36) continuously to the front cover (7).

According to the first aspect of the present invention, the vehicle approach notification control apparatus includes the pseudo engine sound volume storage means for storing sound volume data of engine sound with respect to the entire running sound upon running of an engine driven vehicle and a control unit for controlling the notification sound, and the sound generation means is controlled based on the sound volume data stored in the pseudo engine sound volume storage means upon low speed running of the electric motorcycle. Therefore, pseudo engine sound equivalent to that of an engine driven motorcycle of the same vehicle rank upon low-speed running can be generated, and an appropriate full running sound volume adjusted to road noise of a tire or the like, which increases as the vehicle speed increases, can be generated. Further, engine sound upon low-speed running can be generated well to a walker or the like in comparison with a four-wheeled vehicle and the pseudo engine sound can be controlled so that it does not become excessively high together with increase of the vehicle speed.

According to the second aspect of the present invention, the pseudo engine sound volume data is set so that the sound volume decreases in response to an increase of the vehicle speed and becomes zero when the predetermined vehicle speed is reached. Therefore, the pseudo engine sound is recognized well by a walker or the like upon driving at a very low speed from the vehicle speed of zero, and the pseudo engine sound is recognized with a running sound such as road noise of a tire or the like as the vehicle speed increases. Consequently, the running sound does not become excessively high. Further, since the notification sound becomes zero, if the vehicle speed reaches the predetermined vehicle speed, also power consumption can be suppressed, which is advantageous for the power of a small-sized electric motorcycle.

According to the third aspect of the present invention, the electric motorcycle includes the centrifugal clutch provided on the driving route for driving the driving wheel from the electric motor, and the control unit controls the sound generation means in response to the motor speed in a state in which the vehicle speed is in the proximity of zero before the speed of the electric motor reaches a connection speed of the centrifugal clutch. Therefore, similarly to an engine driven vehicle such as a scooter, the pseudo engine sound can be generated before the centrifugal clutch is brought into a connected state, that is, also in a state in which a vehicle speed before starting is not obtained, and a starting timing of the electric motorcycle can be recognized by a walker or the like.

According to the fourth aspect of the present invention, the pseudo engine sound volume data is set so as to correspond to engine sound of a maximum total stroke volume of an engine driven vehicle of a vehicle category that is the same as the vehicle category into which the electric motorcycle falls. Therefore, since the vehicle category has a correlation with the size, weight and driving speed of the vehicle, when the size, weight and so forth of an approaching vehicle is assumed based on pseudo engine sound recognized from sound by a walker, a better danger avoiding behavior can be urged by emitting sound of a maximum engine total stroke volume of the corresponding vehicle category.

According to the fifth aspect of the present invention, the vehicle approach notification control apparatus further includes the raindrop sensor for detecting a rain amount and the illuminance sensor for detecting brightness, and the control unit carries out, in the case where a rainfall state is detected by the raindrop sensor, correction for increasing the sound volume of the sound generation means, but carries out, in the case where it is detected by the illuminance sensor that it is nighttime, correction for decreasing the sound volume of the sound generation means. Therefore, sound generation control in accordance with a surrounding environment can be carried out and good sound generation to a walker or the like can be executed.

According to the sixth aspect of the present invention, the control unit is connected to the horn switch provided on the handle cover, which covers the steering handle member of the electric motorcycle, and causes, if a switching on operation of the horn switch is detected, the sound generation means to generate horn sound. Therefore, the sound generation means can be used also as a horn function and the number of parts can be decreased.

According to the seventh aspect of the present invention, the sound generation means is the speaker provided on the vehicle body rear side of the front cover, which covers the head pipe of the vehicle body frame of the electric motorcycle from the front, and the control unit is disposed in the proximity of the speaker on the vehicle body rear side of the front cover. Therefore, the sound generation means and the control unit are disposed in the front cover at the front portion of the vehicle. Consequently, sound emission to a walker can be carried out from the front portion of the vehicle. Further, since also the control unit itself can be disposed in the proximity of the speaker, a connection wiring line can be made short. Further, where the approach notification control apparatus is set as an optional part, the speaker and the control unit can be mounted collectively after the front cover is removed, and consequently, the fabrication steps can be decreased.

According to the eighth aspect of the present invention, the control unit is disposed on the inner side of the handle cover, which covers the steering handle member of the electric motorcycle, and in the proximity of the right side handle grip attached to one end portion of the handle bar of the steering handle member at a lower portion of the handle bar. Therefore, the control unit can be attached effectively utilizing the portion which forms the blank space in the electric motorcycle in which a starter button (self-starting button) for an engine is not required.

According to the ninth aspect of the present invention, the vehicle approach notification control apparatus further includes the notification sound switch for switching operation of the control unit on or off, and the notification sound switch is configured integrally with the speaker. Further, the operation element for operating the notification sound switch so as to be projected and retracted is configured so as to be exposed rearwardly of the vehicle body from a through-hole formed in a leg shield, which covers the vehicle body rear side of the head pipe continuously to the front cover. Therefore, the user can arbitrarily select whether the system should be rendered operative or inoperative in such a case that neighbors are asleep at a time when there are no people, such as in the early morning, and consequently, usability of the system can be enhanced. Further, the notification sound switch can be provided integrally with the speaker to decrease the number of parts, and can be exposed in the proximity of the handle section where the rider can readily use the notification sound switch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8(a) is a front elevational view and FIG. 8(B) is a sectional view of a cover member according to a second modification to the cover member shown in FIG. 5;

FIG. 9 is an enlarged front elevational view showing a structure around a front stay;

DETAILED DESCRIPTION OF THE PREFERRED EMBODIMENTS

Figure 1:
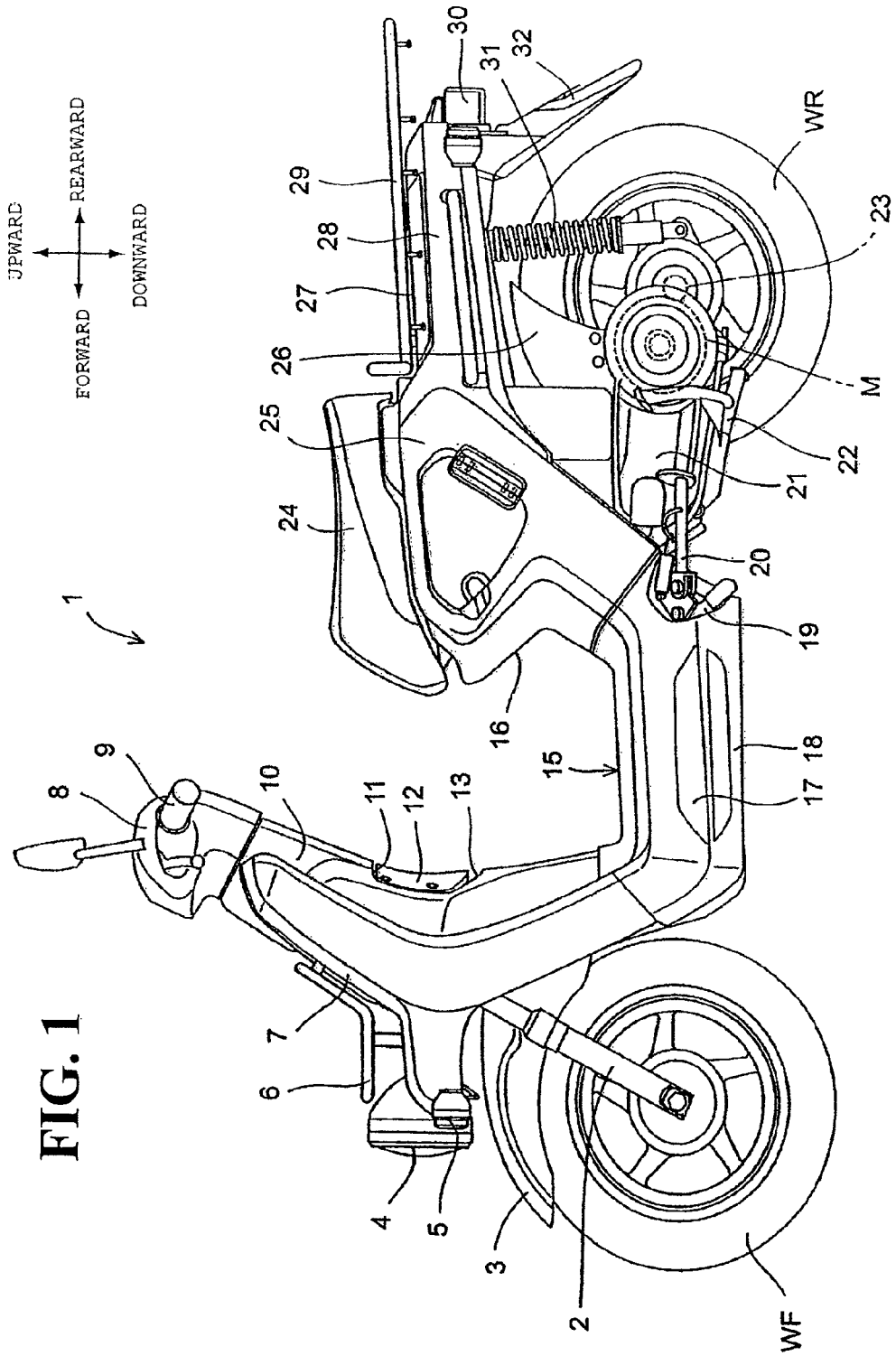
FIG. 1 is a side elevational view of an electric motorcycle, which includes a vehicle approach notification control apparatus according to an embodiment of the present invention.

The present invention will now be described with reference to the accompanying drawings, wherein the same reference numerals have been used to identify the same or similar elements throughout the several views.

Figure 2:
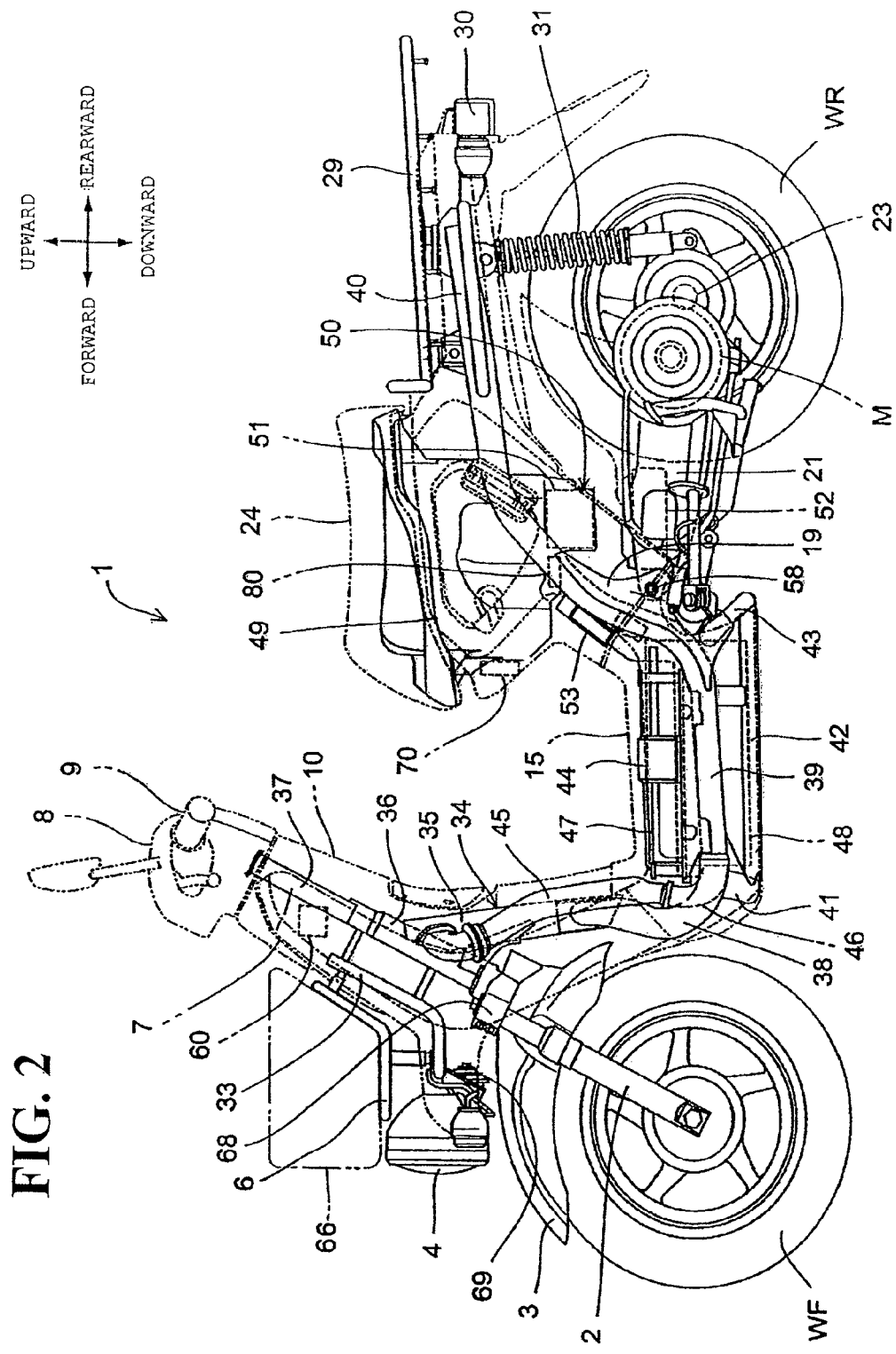
FIG. 2 is a see-through side elevational view of the electric motorcycle.

FIG. 1 is a side elevational view of an electric motorcycle 1, which includes a vehicle approach notification control apparatus according to an embodiment of the present invention. FIG. 2 is a see-through side elevational view of the electric motorcycle 1. The electric motorcycle 1 is a saddle type electric vehicle of the scooter type having a low floor 15. A rear wheel WR supported for rotation on an axle 23 is driven to rotate by rotating power exhibited by an electric motor M built in a swing arm 21.

A vehicle body frame 34 of the electric motorcycle 1 includes a head pipe 36 inclined rearwardly upwards and supporting a front fork 2 for supporting a front wheel WF for rotation thereon and a steering handle member 9 in the form of a bar connected to an upper portion of the front fork 2 for steering movement. A main frame 35 extends rearwardly downwards from the head pipe 36. A pair of left and right under frames 39 are connected to a lower portion of the main frame 35 through curved portions 38 and extend rearwardly. A pair of left and right rear frames 40 integrally connect to a rear end of the under frames 39 and extend rearwardly upwards. The head pipe 36 supports a steering stem 37 for rotation thereon. The steering handle member 9 is secured to an upper end of the steering stem 37. An under bracket 68 for supporting an upper end portion of the front fork 2 is secured to a lower end portion of the steering stem 37.

On a pivot plate 19 provided at a front portion of the rear frames 40 of the vehicle body frame 34, a side stand 20 for keeping the vehicle body in an erected state inclined to the left side is mounted for pivotal motion. The swing arm 21 is supported at a front portion thereof for rocking motion through a pivot shaft 58. A rear cushion unit 31 is provided between a rear portion of the left side rear frame 40 and a rear portion of the swing arm 21. Further, a main stand 22 for erecting the vehicle body uprightly is attached to a lower portion of the swing arm 21. The swing arm 21 is of the cantilever type for supporting the rear wheel WR for rotation only by means of an arm on the left side in the vehicle widthwise direction. A PDU (power drive unit) 52 for controlling output power of the electric motor M is disposed at a position immediately rearwardly of the pivot shaft 58 forwardly of the cantilever arm.

The electric motorcycle 1 includes a front cover 7 for covering the head pipe 36 from the front. A leg shield 10 extends from rearwardly of the head pipe 36 to the front cover 7 in such a manner as to cover the legs of a rider seated on a seat 24 from forwardly. The low floor 15 connects to a lower portion of the leg shield 10 such that the feet of the rider seated on the seat 24 are placed thereon and covering a battery case 47 from above. A pair of left and right floor side covers 17 depend from the opposite sides of the low floor 15 in such a manner as to cover the opposite sides of the under frames 39. An undercover 18 interconnects lower edges of the floor side covers 17. A seat lower front cover 16 extends upwardly from a rear end of the low floor 15 in such a manner as to cover a lower portion of the seat 24 from the front. A pair of left and right side covers 25 connect to the opposite sides of the seat lower front cover 16 in such a manner as to cover a lower portion of the seat 24 from the opposite sides. A rear cover 28 connects to the side covers 25 and covers the rear wheel WR from above.

The battery case 47 is covered with the low floor 15, the floor side covers 17, the under cover 18, the seat lower front cover 16 and the side covers 25. A headlamp 4 is disposed at a front end of the front cover 7 in such a manner that it is supported by a front stay 33 secured to the head pipe 36. A tail lamp 30 is attached to the rear frame 40. A rear fender 32 is disposed below the tail lamp 30.

Direction indicators 5 are disposed on the left and right of the headlamp 4 in the vehicle widthwise direction. A horn 69 for issuing an alarm is disposed rearwardly of the headlamp 4. A front fender 3 disposed below the front cover 7 is attached to the front fork 2 in such a manner as to cover the rear wheel WR from above while a sub fender 26 for covering the rear wheel WR from obliquely forwardly upwardly is attached to an upper portion of the swing arm 21.

The steering handle member 9 is covered at a middle portion thereof in the vehicle widthwise direction with a handle cover 8. A front carrier 6 disposed forwardly of the front cover 7 is supported on the front stay 33. A load basket 66 or the like can be attached to the front carrier 6. A luggage carrier 27 is provided at an upper portion of the rear cover 28 rearwardly of the seat 24. A rear carrier 29 disposed above the luggage carrier 27 is removably attached to the rear frame 40.

The battery case 47 in which a high voltage battery 48 of, for example, 72 V for supplying power to the electric motor M is built is disposed between the left and right under frames 39 in such a manner that it is supported by the under frames 39. Further, a cross member 44 extending across a substantially central portion of the battery case 47 is provided between the left and right under frames 39. The low floor 15 is supported by the cross member 44.

At a front portion of the under frames 39, a front protective member 41 for protecting a front side lower portion of the battery case 47 from forwardly is provided in such a manner that a central portion thereof is connected to a lower end of the main frame 35. Further, at a rear portion of the under frames 39, a rear protective member 43 for protecting a rear lower portion of the battery case 47 from rearwardly is provided. A plurality of lower protective members 42 extending in the forward and backward direction of the vehicle body is provided between the front and rear protective members 41 and 43 in such a manner that they project the battery case 47 from below.

A pair of left and right cooling air introduction ducts 45 are connected at a downstream end portion thereof to a front portion of the battery case 47 through a connecting pipe 46. The cooling air introduction ducts 45 extend along the main frame 35 in such a manner as to sandwich the main frame 35 from the opposite sides in the leg shield 10. A recess 11 concave in the forward direction of the vehicle body is formed at a position of the leg shield 10 corresponding to the connecting portion between the main frame 35 and the head pipe 36. A lid 12, which covers an upper portion of the recess, 11 is attached to the leg shield 10. An air inlet port 13 is formed between a lower edge of the lid 12 and the recess 11. The cooling air introduction ducts 45 are connected on an upper end side thereof to the leg shield 10 in a communicating relationship with the air inlet port 13.

A cooling fan 53 is attached to an upper face of a rear portion of the battery case 47 such that air taken in from the air inlet port 13 by operation of the cooling fan 53 is introduced into the battery case 47 through the cooling air introduction ducts 45 and the connecting pipe 46 thereby to cool the high voltage battery 48 in the battery case 47.

An accommodating box 49 made of synthetic resin and disposed below the seat 24 above the swing arm 21 is disposed between the left and right rear frames 40 in such a manner that it is supported by the rear frames 40. The accommodating box 49 is covered from above with the openable and closable seat 24. An accommodating recess 50 for accommodating therein a low voltage battery 51, for example, of 12 V for supplying power to auxiliaries such as the headlamp 4 and the tail lamp 30 is formed integrally at a lower portion of the rear side of the accommodating box 49 in such a manner that it projects downwardly.

The vehicle approach notification control apparatus according to the present invention outputs predetermined notification sound from the speaker as sound generation means attached to the self vehicle to notify a walker and so forth of approach of the self vehicle. In the electric motorcycle 1 according to the present embodiment, a speaker 60 for emitting notification sound is provided at a position higher than the head pipe 36 on the inner side with respect to the front cover 7 and a control unit 80 for controlling the output of the speaker 60 is disposed forwardly of the low voltage battery 51 in the accommodating box 49.

Further, it is possible to provide a plurality of speakers for emitting notification sound on the vehicle body, and in the present embodiment, a second speaker 70 is disposed on a front end face of the accommodating box 49 centrally in the vehicle widthwise direction. With the second speaker 70, outputted notification sound is reflected by the leg shield 10 and so forth so that the notification sound can be recognized also from the left, right and rear of the vehicle body.

Figure 3:
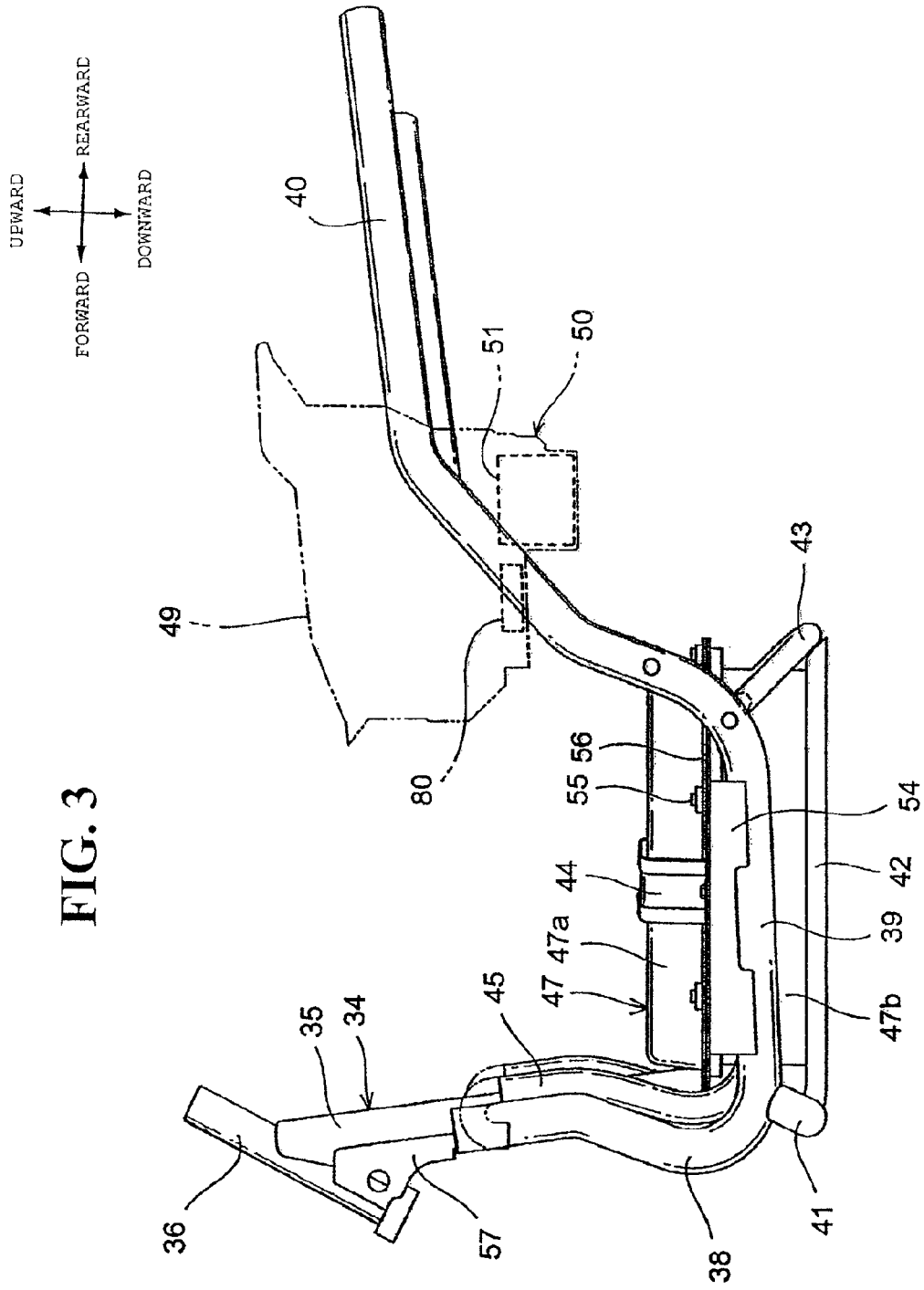
FIG. 3 is a side elevational view of a vehicle body frame.
Figure 4:
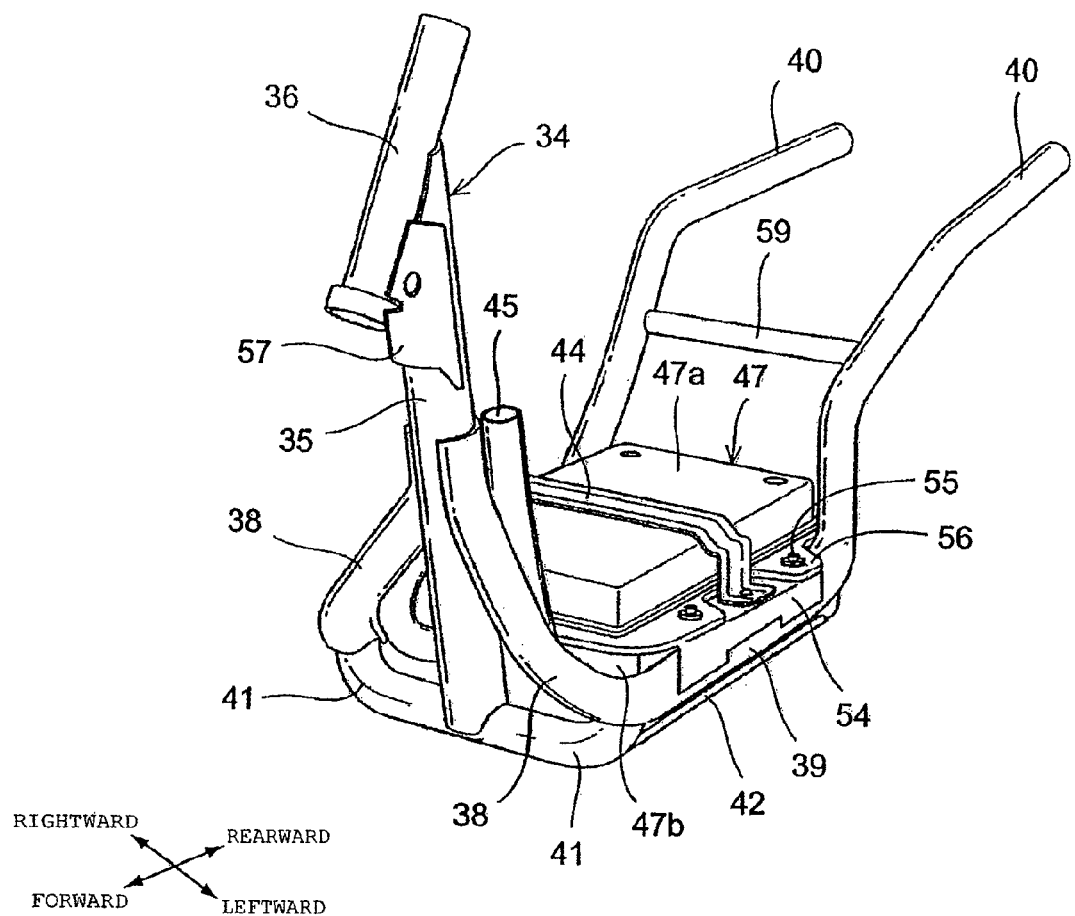
FIG. 4 is a perspective view of the vehicle body frame.

FIGS. 3 and 4 are a side elevational view and a perspective view of the vehicle body frame 34, respectively. A gusset 57, which increases the coupling strength between the head pipe 36 and the main frame 35 and functions as an attaching stay for various auxiliaries, is provided at a joining portion of the head pipe 36 and the main frame 35. The main frame 35 extends linearly in a rearwardly downward direction from the head pipe 36 and is connected to the front protective member 41, which extends in the vehicle widthwise direction. The cooling air introduction ducts 45 extend along the main frame 35 in such a manner that they sandwich the main frame 35 from the opposite sides in the leg shield 10. The under frames 39 are formed integrally with the curved portions 38 connected to the left and right in the vehicle widthwise direction of the main frame 35 below the gusset 57. The front protective member 41 is jointed at left and right end portions thereof in the vehicle widthwise direction to the curved portions 38. Further, a first cross pipe 59 extending in the vehicle widthwise direction is disposed between the left and right rear frames 40 rearwardly upwardly of the battery case 37.

It is to be noted that the attaching position of the second speaker can be changed in various manners, and for example, also it is possible to attach the second speaker, for example, between left and right portions of the front protective member 41 at a lower end portion of the main frame 35.

The battery case 47 in which the high voltage battery 48 is accommodated is configured from a case main body 47b of a bottomed box shape, and a lid 47a which covers an opening at an upper portion of the case main body 47b. A flange portion 56 is formed around a joining plane between the case main body 47b and the lid 47a.

A side bracket 54 is secured by welding to an upper face of each of the under frames 39. The cross member 44 and the flange portion 56 of the battery case 47 are secured to this side bracket 54. The flange portion 56 is formed bypassing the cross member 44 and is secured to an upper face of the side bracket 54 by bolts 55. The lower protective members 42 for protecting the battery case 47 are provided between the front protective member 41 and the rear protective member 43 and connect the front and rear protective members 41 and 43 to each other.

Figure 5:
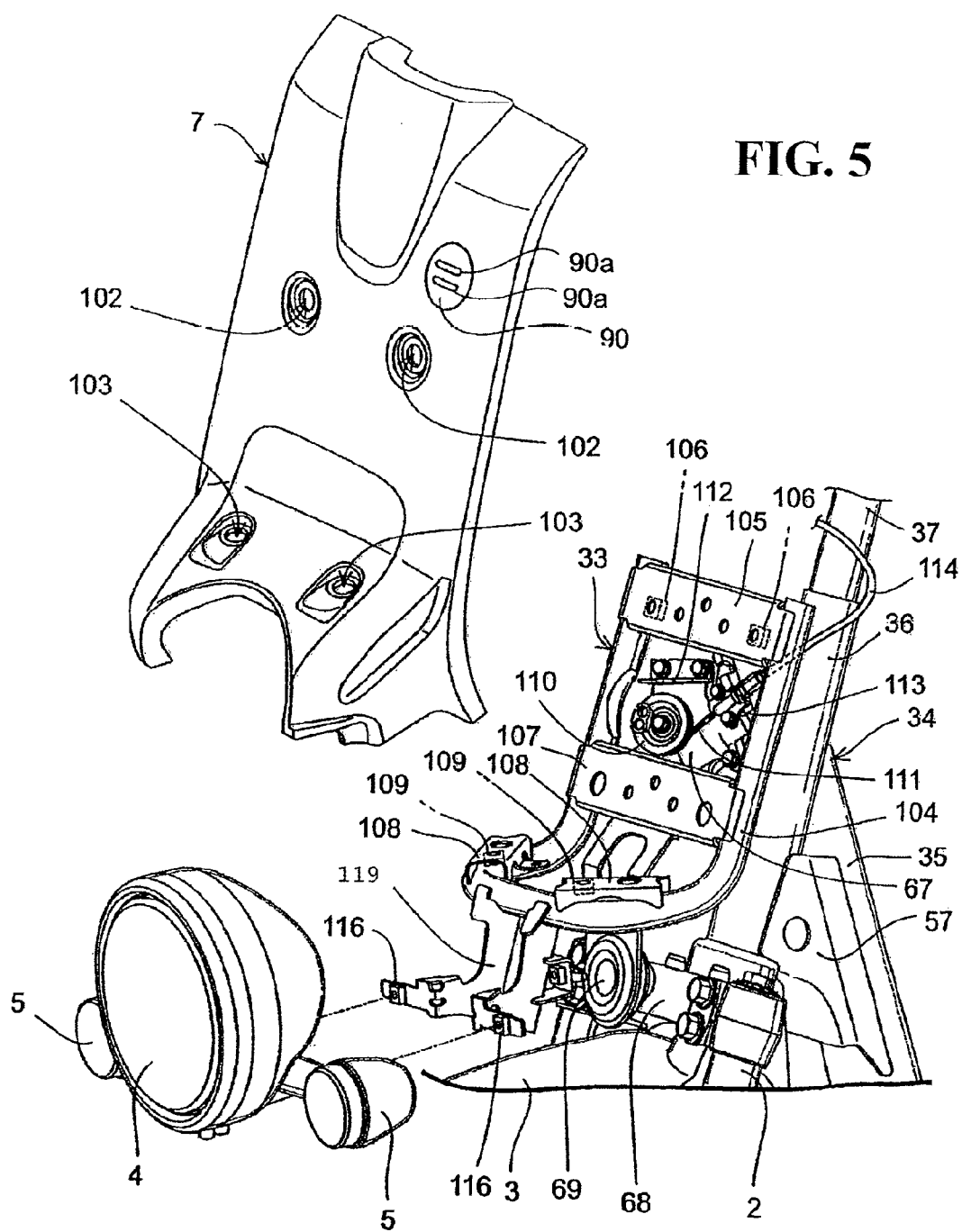
FIG. 5 is an exploded perspective view of a front portion of a head pipe.

FIG. 5 is an exploded perspective view of a front portion of the head pipe 36. Like reference characters to those described hereinabove denote like or equivalent elements. The headlamp 4 and the direction indicators 5 are formed as a unit. The front stay 33 which supports this lamp unit is formed from an upright frame portion 104 disposed so as to have a space in the leftward and rightward direction and disposed forwardly of the head pipe 36 by being formed by bending of a single round pipe material, and an upper side connecting plate 105 and a lower side connecting plate 107 which connect liner portions of the upright frame portion 104 on the left and right to each other. The front stay 33 is secured to the head pipe 36 by a pipe material (not shown) coupled to the rear face side of the upper and lower connecting plates 105 and 107.

A pair of left and right support bases 108 are provided forwardly of a lower portion of the upright frame portion 104, and weld nuts 109 are welded to a lower face of each of the support bases 108. Further, two weld nuts 106 are welded also at two places of the upper side connecting plate 105 spaced from each other on the left and the right. Lower side carrier securing holes 103 are formed at a portion of the front cover 7, which corresponds to the weld nuts 109 of the support bases 108, while upper side carrier securing holes 102 are formed at a portion of the front cover 7, which corresponds to the weld nuts 106 of the upper side connecting plate 105.

The front carrier 6 is secured to the front stay 33 by cofastening using fastening members fitted in the carrier securing holes 102 and 103. To forward downward portions of the front stay 33 between the left and right support bases 108, headlamp stay 119 for securing the headlamp 4 using a pair of left and right weld nuts 116 are attached.

The electric motorcycle 1 is configured such that a throttle operation is carried out by turning motion of a throttle grip attached to a right side end portion of the steering handle member 9. In the present embodiment, a sensor main body 67 of a throttle opening sensor for detecting this throttle operation is disposed at a position forwardly of the head pipe 36. A throttle wire 111 connected to the throttle grip is connected at the other end portion thereof to an outer peripheral end portion of a pulley 110 attached for rotation to the sensor main body 67. Consequently, an operation state of the throttle grip can be detected based on the rotational state of the rotary shaft of the pulley 110. The pulley 110 is normally biased in a direction in which the throttle is returned by a torsion coil spring not shown.

A throttle cable 114 including the throttle wire 111 coated with an outer tube is laid from the right side to the left side in the vehicle widthwise direction forwardly of the head pipe 36 and is, while being curved, laid back to the right side and then is secured to a predetermined position by an attaching stay 113. A protective hood 112 for preventing the pulley 110 from contacting with any other part or the like is provided above the pulley 110.

A circular cover member 90 in which two through-slits 90a are formed at a portion of an upper portion of the upper side carrier securing hole 102 which corresponds to a position of the speaker 60, which notifies a walker or the like of approach of the electric motorcycle 1, forwardly of the vehicle body, and which is displaced leftwardly in the vehicle widthwise direction of the front cover 7. The cover member 90 is removably mounted on the front cover 7.

Figure 6:
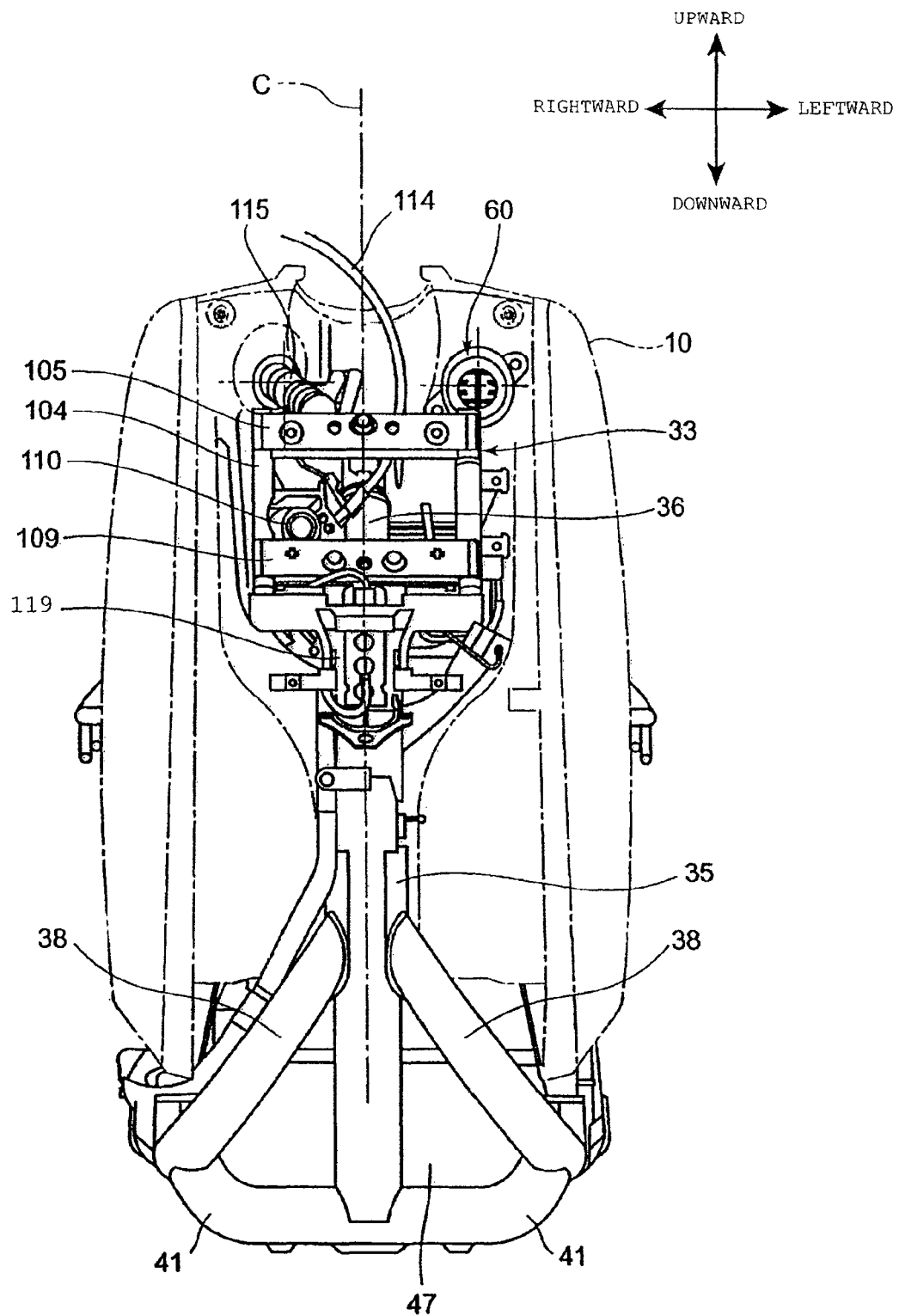
FIG. 6 is a front elevational view of a vehicle body in a state in which a front cover and so forth are removed.

FIG. 6 is a front elevational view of the vehicle body in a state in which the front cover 7 and so forth are removed. Like reference characters to those described hereinabove denote like or equivalent elements. The speaker 60 is disposed in an offset relationship to the vehicle body left side with respect to the head pipe 36 at the center in the vehicle widthwise direction on the face of the leg shield 10 on the vehicle body front side. Meanwhile, on the right side in the vehicle widthwise direction across the head pipe 36, a key cylinder 115 of a main switch is disposed. A keyhole into which a main key (not shown) is to be inserted is formed at one end portion of the key cylinder 115, and this keyhole is exposed to the vehicle body rear side from a through-hole provided in the leg shield 10 (refer to FIG. 12). The speaker 60 and the key cylinder 115 are advantageous in weight balance, threading of a cable or the like and so forth since it is disposed at a substantially equal distance in the vehicle widthwise direction and at a substantially same height with respect to the center of the vehicle body (head pipe center C).

The speaker 60 is disposed so as to be directed forwardly of the vehicle body from an upper portion of the upper side connecting plate 105 of the front stay 33. Since also the front carrier 6 (refer to FIG. 2) attached to the front stay 33 is formed in conformity with the height of the front stay 33, notification sound outputted from the speaker 60 is not disturbed by the front carrier 6 and so forth. Also when the load basket 66 of a large size (refer to FIG. 2) or the like is attached to the front carrier 6, since the speaker 60 is disposed at a position rather near to an upper portion of the load basket 66, even if a baggage is placed in the load basket 66, the possibility that generated sound may be disturbed is reduced.

The pulley 110 of the throttle opening sensor is disposed below the key cylinder 115 on the right side in the vehicle widthwise direction, and the throttle cable 114 is laid from forwardly of the head pipe 36 past the left side in the vehicle widthwise direction and then to the right side of the vehicle body past the rear of the head pipe 36.

Figures 7A, 7B:
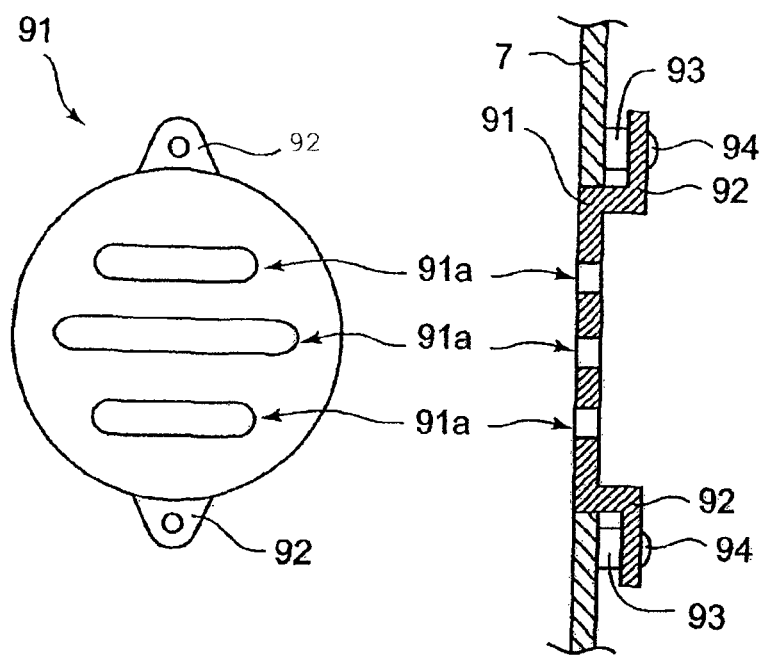
FIG. 7(a) is a front elevational view and FIG. 7(b) is a sectional view of a cover member according to a modification to a cover member shown in FIG. 5.

FIG. 7(a) is a front elevational view and FIG. 7(b) is a sectional view of a cover member 91 according to a modification to the cover member 90 shown in FIG. 5. Three through-slits 91a through which notification sound passes are disposed in the cover member 91. Flanges 92 are provided on an outer peripheral portion of the cover member 91 such that the cover member 91 can be secured to the front cover 7 by screws 94 using bosses 93 provided on the rear face side of the front cover 7. Since the cover member 91 is configured for removable mounting on the front cover 7, for example, it is possible to fit with cover members of other various shapes in order to carry out sound volume adjustment of notification sound or design change or to fit, in a vehicle which does not include the speaker 60, with a lid member having no through-slit.

FIG. 8(*a*) is a front elevational view and FIG. 8(*b*) is a sectional view of a cover member 95 according to a second modification to the cover member 90 shown in FIG. 5. The sectional view in FIG. 8(*b*) is a sectional view taken along line A-A of the front elevational view in FIG. 8(*a*). The cover member 95 is formed from a base member 96 in which window portions 96*a* of a substantially sectoral shape are formed, and a rotatable plate 97 for closing up the window portions 96*a*. The rotatable plate 97 is configured for engaging at an outer circumferential end face 99 thereof with an inner circumferential groove of the base member 96 so as to be rotatable. Consequently, by gripping an operating projection 100 to rotate the rotatable plate 97, the opening area of the window portions 96*a* can be changed arbitrarily. Flanges 98 are provided on an outer circumferential portion of the cover member 95, and are secured to the front cover 7 by means of screws 122 using bosses 101 provided on the rear face side of the front cover 7.

FIG. 9 is an enlarged front elevational view showing a structure around the front stay 33. Like reference characters to those described hereinabove denote like or equivalent elements. The protective hood 112 which covers the pulley 110 from above is inclined such that it assumes a lower position toward the outer side in the vehicle widthwise direction and is disposed at a front end portion thereof forwardly of the vehicle body with respect to the center portion of the pulley 110. The sensor main body 67 (refer to FIG. 5) and the pulley 110 are disposed adjacent the head pipe 36 and rearwardly with respect to the position of a lower end portion of the head pipe 36 as viewed in side elevation of the vehicle body. Further, as viewed in front elevation of the vehicle body, the sensor main body 67 and the pulley 110 are disposed in an offset relationship to the right side in the vehicle widthwise direction from the head pipe 36.

Since the sensor main body 67 and the pulley 110 of the throttle opening sensor are disposed between the upright frame portion 104 of the front stay 33 and the head pipe 36 as viewed in side elevation, even if external force is applied to the front cover 7, the possibility that the sensor main body 67 or the pulley 110 may be influenced by the external force is reduced.

Further, also the taking out direction of the rotary shaft of the pulley 110 or the throttle wire 111 is inclined with respect to the axial direction of the head pipe 36 in conformity with the throttle cable 114 which is disposed in a curved stage forwardly of the head pipe 36. Consequently, the possibility that a turning operation of the steering handle member 9 may have an influence on the sensor output is reduced. While the throttle cable 114 is curved arcuately and passes between the head pipe 36 and the speaker 60, it is guided to the front of the head pipe 36 and is connected to the pulley 110 supported for rotation on the sensor main body 67 of the throttle opening sensor.

Further, with the protective hood 112 provided above the pulley 110, even if a screw or a bolt drops from a fastening location above the head pipe 36 upon assembly, it is possible for the protective hood 112 to receive the dropping article so that it may not have an influence on the rotating operation of the pulley 110. Since the protective hood 112 is inclined outwardly downwardly in the vehicle widthwise direction, the screw, bolt or the like dropping from above can be dropped outwardly in the vehicle widthwise direction, that is, in a direction toward a position at which a smaller number of attachment members exist and water and so forth can be prevented from being accumulated at an upper portion of the protective hood 112.

Further, on a side face portion of the upright frame portion 104 on the right side in the vehicle widthwise direction, a recessed portion 104*a* for preventing interference between the upright frame portion 104 and the pulley 110 even if the upright frame portion 104 should be moved rearwardly by an action of external force from forwardly is formed.

Figure 10:
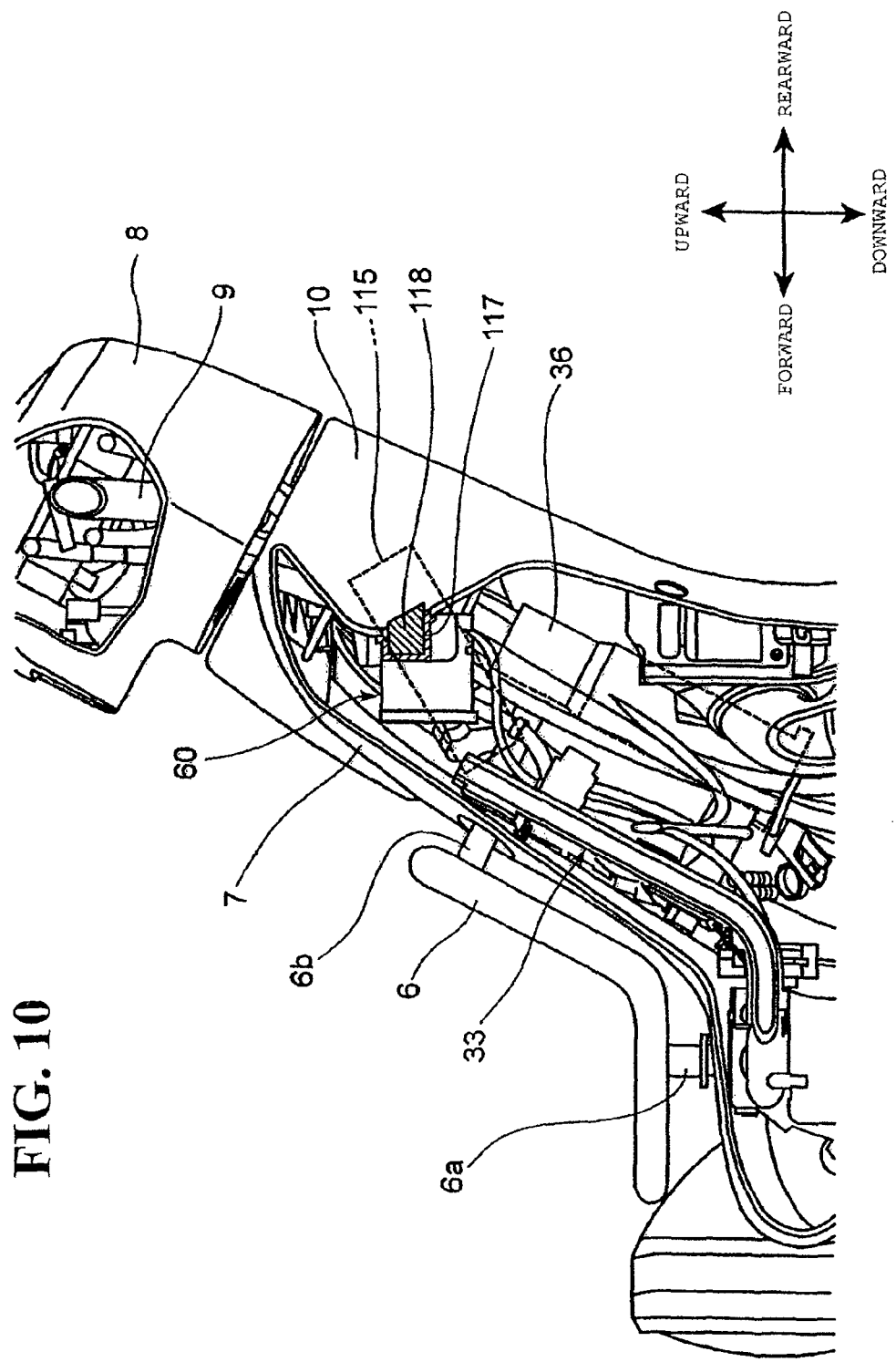
FIG. 10 is a partial sectional side elevational view showing a structure around the head pipe.

FIG. 10 is a partial sectional side elevational view showing a structure around the head pipe 36. The front carrier 6 is secured to the front stay 33 through round pipe stays 6*a* and 6*b*. The front carrier 6 can be configured from frame portions which are disposed in a spaced relationship from each other in the leftward and rightward direction by being formed, for example, by bending working of a single round pipe material, and a plate-like member which connects liner portions of the frame portions to each other.

As described hereinabove, the speaker 60 which outputs notification sound is disposed rearwardly upwardly of the front stay 33 on the left side in the vehicle widthwise direction of the head pipe 36. In the present embodiment, a notification sound switch for selecting whether or not notification sound should be outputted is provided integrally with a rear portion of the speaker 60. A notification sound switch 118 is an on/off switch of the projectable/retractable type which is slidably operated in the forward and backward directions of the vehicle body with respect to a retaining member 117 secured to a wall face of the leg shield 10. An operating element of the notification sound switch 118 is exposed to a face of the leg shield 10 on the vehicle body rear side. The key cylinder 115 and the speaker 60 are disposed forwardly upwardly of the head pipe 36 in an overlapping relationship with each other as viewed in side elevation of the vehicle body.

Figure 11:
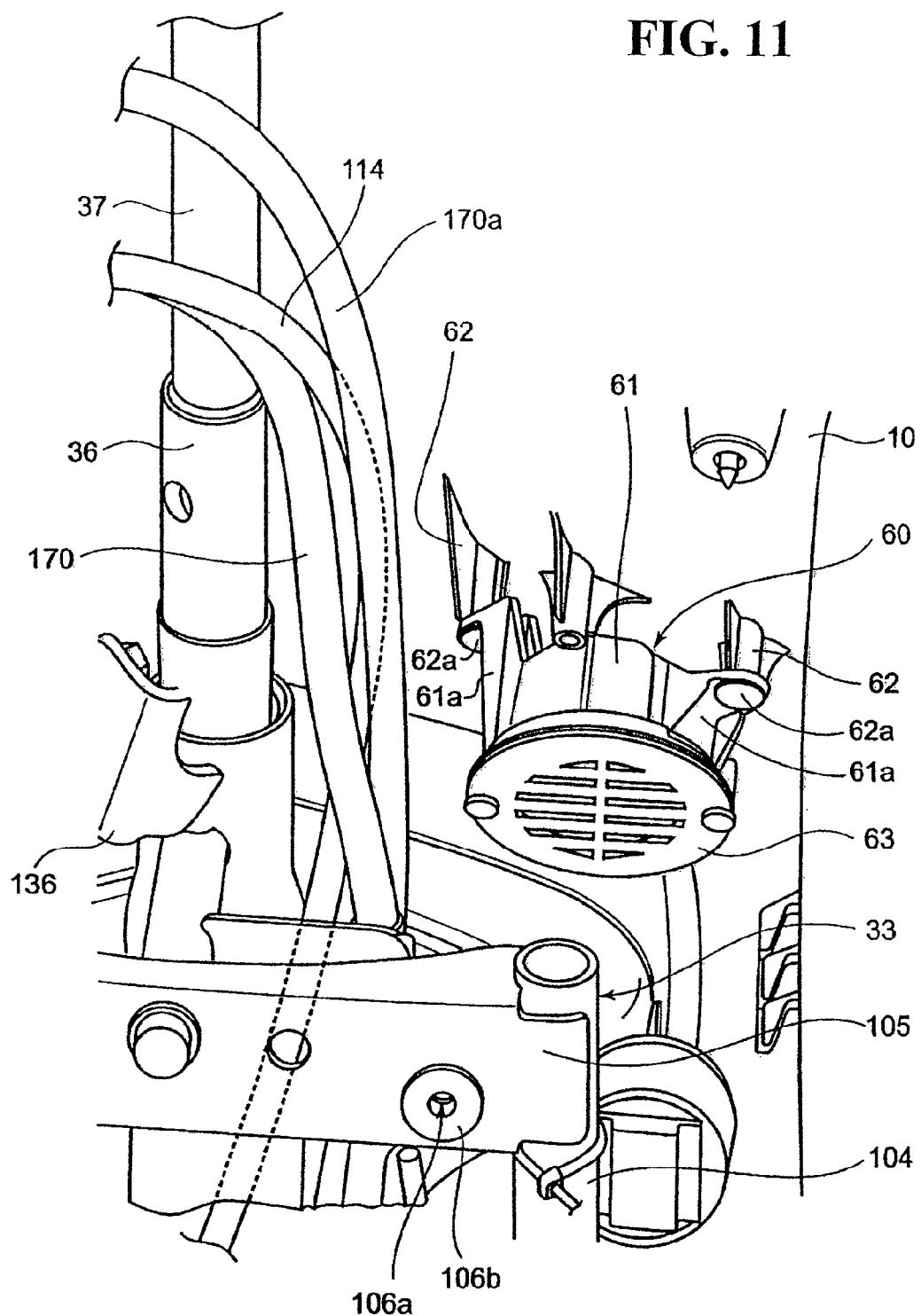
FIG. 11 is a perspective view illustrating an attached state of a speaker.

FIG. 11 is a perspective view illustrating an attached state of the speaker 60. In the speaker 60, a functioning part such as cone paper, a magnet or the like is accommodated between a rear side case 61 and a front side cover 63. The speaker 60 is secured by fastening two flanges 61*a* formed on the rear side case 61 to bosses 62 formed on the front face of the leg shield 10 by fastening members 62*a* such as screws.

A harness 170 is laid on the left side in the vehicle widthwise direction of the head pipe 36 such that it extends along the throttle cable 114 which is laid to the front side of the vehicle body past the left side in the vehicle widthwise direction forwardly of the head pipe 36. A front brake cable 170*a* is laid sidewardly of the harness 170. A damping grommet 106*b* made of rubber is attached to a position of the upper side connecting plate 105 of the front stay 33 which corresponds to a threaded hole 106*a* of a weld nut 106 (refer to FIG. 5). It is to be noted that a damping grommet is attached not only to the portion corresponding to the weld nut 106 on the right side in the vehicle widthwise direction but also to a portion corresponding to the weld nuts 109 of the support bases 108 (refer to FIG. 5) of the front stay 33.

Figure 12:
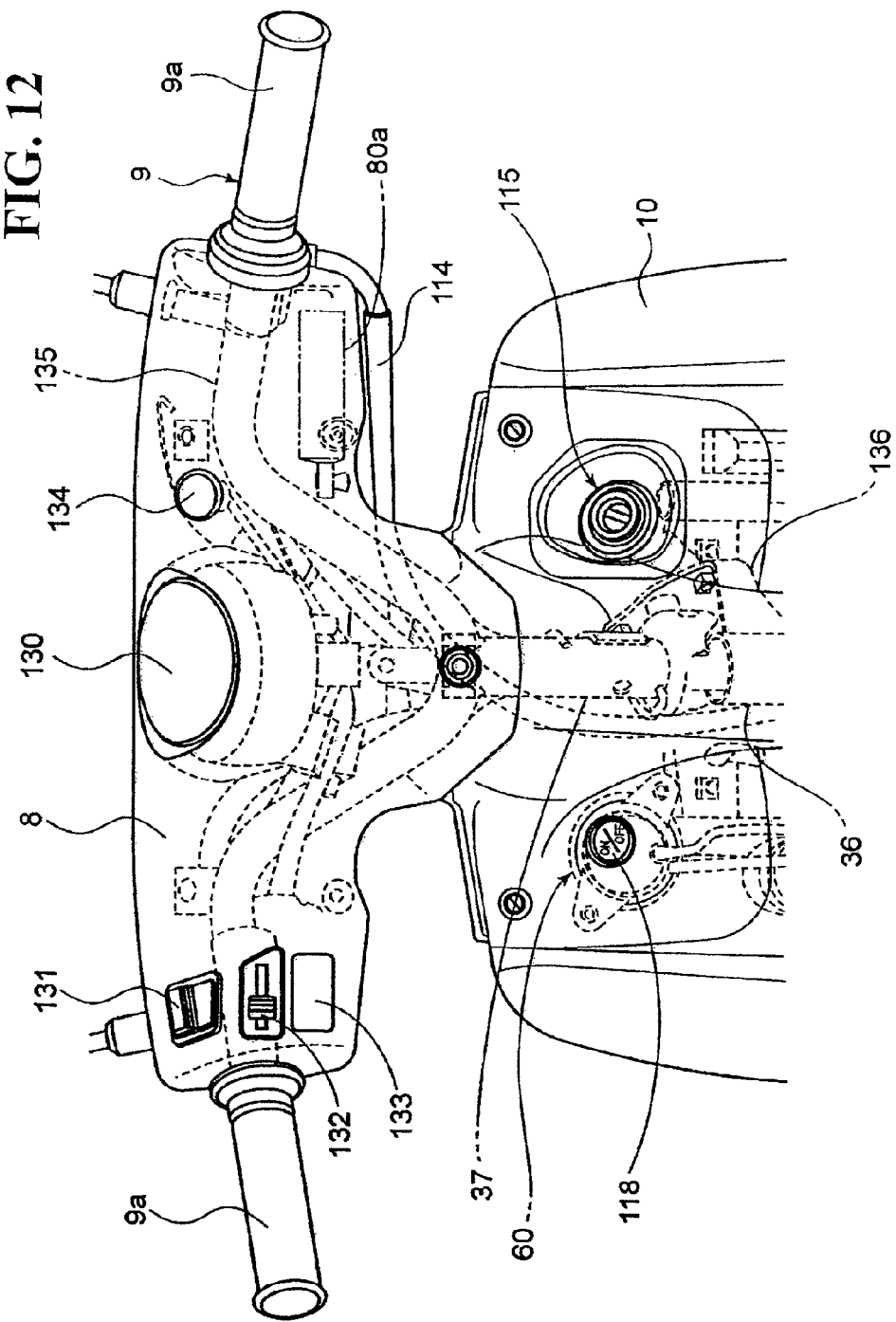
FIG. 12 is a perspective view showing a structure around a steering handle member.

FIG. 12 is a perspective view showing a structure around the steering handle member 9. This figure corresponds to a state which is overlooked from a point of view of the rider. The steering handle member 9 is formed from a handle pipe 135 fixed to an upper end portion of the steering stem 37 supported for pivotal motion on the head pipe 36, and handle grips 9*a* secured to the opposite end portions of the handle pipe 135. The handle grip 9*a* on the right side in the vehicle widthwise direction is supported for rotation with respect to the handle pipe 135 and functions as a throttle apparatus connected to the throttle cable 114.

A meter apparatus 130 for displaying various kinds of information such as a vehicle speed, an accumulated distance and a battery remaining amount is disposed centrally in the vehicle widthwise direction of the handle cover 8. The meter apparatus may be composed of various displays such as liquid crystal display. An operation button 134 for carrying out a changing over operation between an odometer and a trip meter displayed on the meter apparatus 130 and resetting of a trip meter is disposed on the right side in the vehicle width direction.

An optical axis changeover switch 131 for the headlamp 4, an activating switch 132 for the direction indicators 5 and an activating switch 133 for the horn 69 are disposed in order from above on the handle cover 8 in the proximity of the handle grip 9a on the left side in the vehicle widthwise direction.

It is to be noted that, on an ordinary engine driven vehicle, an engine starter button is disposed in the proximity of the handle grip 9a on the right side. However, on the electric motorcycle 1 according to the present embodiment, a starter button is not required and therefore is not provided, and a free space corresponding to the starter button is provided. A control unit 80a for controlling the output of the speaker 60 may be disposed, utilizing the free space, in the inside of the handle cover 8 below the handle pipe 135 on the right side.

The key cylinder 115 is attached to a stay 136 secured to the right side in the vehicle widthwise direction of the head pipe 36, and a keyhole into which a main key is to be inserted is disposed rearwardly upwards from a through-hole formed in the leg shield 10. The notification sound switch 118 for the speaker 60 is disposed on the left side in the vehicle widthwise direction across the head pipe 36. It is to be noted that also it is possible to output approach notification sound using the horn 69 for generating alarming sound or conversely to output alarming sound using the speaker 60 to reduce the number of parts.

Figure 13:
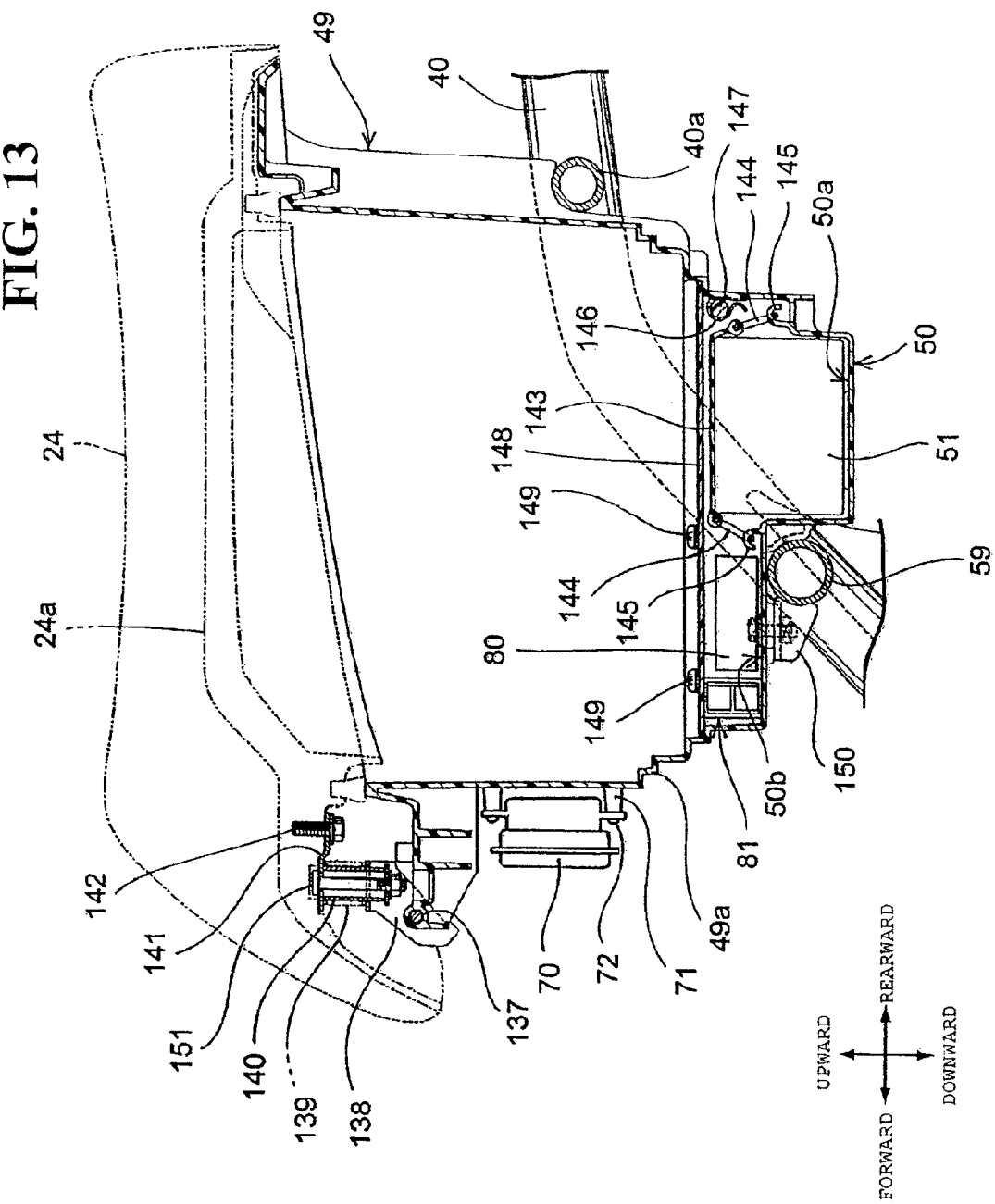
FIG. 13 is a partial sectional side elevational view showing a configuration around an accommodation box.

FIG. 13 is a partial sectional side elevational view showing a configuration around the accommodating box 49. A support shaft 137 directed in the vehicle widthwise direction is disposed at an upper portion of the front end of the accommodating box 49 supported by the pair of left and right rear frames 40 of the vehicle body frame 34. A supported plate 141 is securely mounted on a lower face of a front portion of a bottom plate 24a of the seat 24 by a pair of bolts 142. A supporting member 138 disposed below the supported plate 141 is supported for pivotal motion on the accommodating box 49 through the support shaft 137. A pair of left and right cylindrical members 140 are secured at an upper end thereof to the supported plate 141 by pins 151, and are fitted at a lower portion thereof for upward and downward sliding movement in the supporting member 138. Coiled springs 139 which surround the cylindrical members 140 are interposed between the supporting member 138 and the supported member 141. A buffering stop mechanism when the seat 24 is opened fully is configured from a slide mechanism which uses the springs 139.

The accommodating recess 50 projecting downwardly is formed on the bottom of the accommodating box 49. The accommodating recess 50 is formed from a battery accommodating recessed portion 50a for principally accommodating the low voltage battery 51 therein, and a control unit accommodating recessed portion 50b for principally accommodating the control unit 80 therein. The low voltage battery 51 disposed in the battery accommodating recessed portion 50a is secured to the accommodating box 49 by causing engaging pieces 144 on the opposite ends of a band 143 suspended on an upper face of the low voltage battery 51 to be engaged with hooks 145 fixedly provided on the bottom portion of the accommodating box 49 forwardly and rearwardly of the battery accommodating recessed portion 50a. The low voltage battery 51 is disposed such that a terminal section thereof is positioned upwardly and rearwardly of the vehicle body.

The control unit 80 and the low voltage battery 51 are covered from above with a cover plate 148 removably attached to an upper face of the bottom portion of the accommodating box 49. The cover plate 148 is fastened at four places around the control unit 80 by screw members 149.

The accommodating box 49 is disposed such that it partly overlaps with the rear frame 40 as viewed in side elevation of the vehicle body. The first cross pipe 59 which interconnects the two rear frames 40 in the vehicle widthwise direction is disposed at a height between a lowermost portion of the accommodating recess 50 and the cover plate 148. The control unit 80 is disposed such that it partly overlaps with the rear frame 40 as viewed in side elevation of the vehicle body and overlaps with the first cross pipe 59 as viewed in top plan of the vehicle body. Further, the cover plate 148 is configured such that it covers an upper face of the low voltage battery 51 and the control unit 80 substantially in level with the same. Consequently, a separate independent cover plate for each part becomes unnecessary and besides an accommodation article in the accommodating box can be retained stably.

Stays 150 are securely mounted at two locations of the first cross pipe 59 spaced leftwardly and rightwardly from each other. Weld nuts are securely mounted on a lower face of the stays 150. By screwing bolts into the weld nuts from the bottom face side of the control unit accommodating recessed portion 50b, the accommodating box 49 is secured on the front side thereof to the first cross pipe 59. Further, a second cross pipe 40a for connecting the rear frames 40 to each other is disposed rearwardly upwardly of the first cross pipe 59. A stepped engaging portion for engaging with the second cross pipe 40a from above is formed on a rear wall of the accommodating box 49. A clip 146 for securing a main harness 147 is provided on a rear wall of the battery accommodating recessed portion 50a.

A coupler 81 for connecting the harness extending from the control unit 80 to the harness on the vehicle body side is disposed in the neighborhood on the vehicle body front side of the control unit 80 in the control unit accommodating recessed portion 50b.

The second speaker 70 described hereinabove is secured to the vehicle body front side of the accommodating box 49. The second speaker 70 is secured to a central position in the vehicle widthwise direction by fastening members 72 such as bolts using bosses 71 provided on a wall face 49a on the vehicle body front side of the accommodating box 49. Notification sound outputted from the second speaker 70 is outputted first toward the front side of the vehicle body and then reflected leftwardly and rightwardly in the vehicle widthwise directions and rearwardly of the vehicle body by a face of the leg shield 10 on the vehicle body rear side. Further, since the second speaker 70 is attached to the accommodating box 49, an attaching member for exclusive use for the speaker is unnecessary, and besides the accommodating box 49 serves also as an echo member of the second speaker 70 and a desired sound pressure can be assured by a speaker of a small size.

Figure 14:
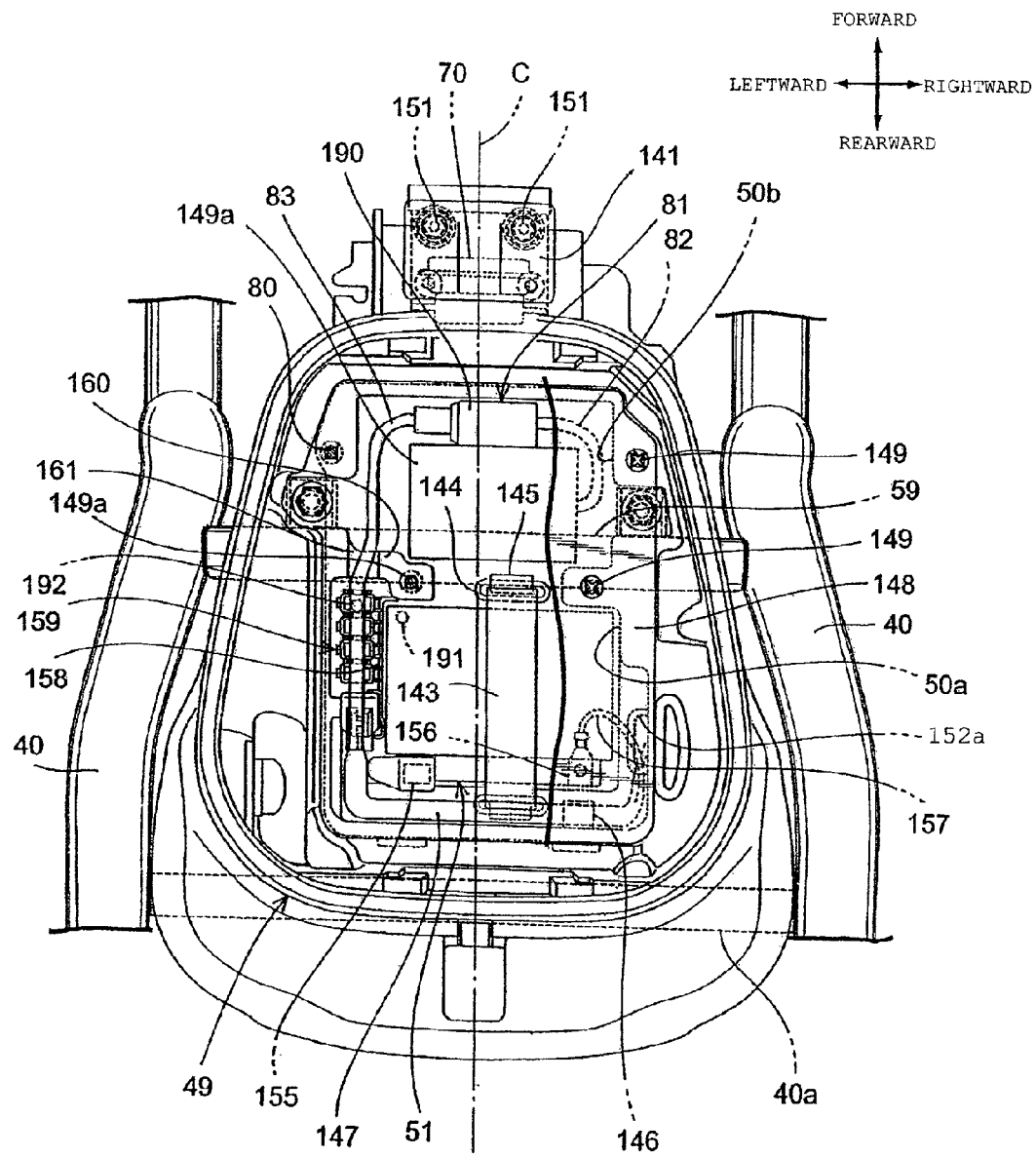
FIG. 14 is a top plan view showing a configuration around the accommodation box.

FIG. 14 is a top plan view showing a configuration around the accommodating box 49. Like reference characters to those described hereinabove denote like or equivalent elements. The low voltage battery 51 accommodated in the battery accommodating recessed portion 50a is disposed such that a positive side terminal 155 and a negative side terminal 156 are positioned rearwardly upwardly of the vehicle body. A power supply line led out from the positive side terminal 155 is taken in the main harness 147 and is laid on one side thereof to the front side of the vehicle body. The other side of the main harness 147 is led out to the outside of the accommodating box 49 from an exit hole 152a formed in the bottom on the right side in the vehicle widthwise direction of the battery accommodating recessed portion 50a in order to supply power to various accessories. Also a ground line led out from the negative side terminal 156 is taken in the main harness 147.

A fuse box 159 is disposed on the left side in the vehicle widthwise direction of the battery accommodating recessed portion 50a. The fuse box 159 is disposed at a position between the bottom of the battery accommodating recessed portion 50a and the bottom of the control unit accommodating recessed portion 50b. A control unit connecting harness 83 led out from the main harness 147 is laid on the front side of the vehicle body in such a manner that it is sandwiched between the fuse box 159 and the cover plate 148 in the upward and downward direction.

A partition plate 158 erected upwardly of the vehicle body is formed between the low voltage battery 51 and the fuse box 159. The fuse box 159 is secured in such a manner that it is sandwiched between the partition plate 158 and a side wall on the left side in the vehicle widthwise direction of the battery accommodating recessed portion 50a. With the partition plate 158, it is made possible to dispose the fuse box 159 in the proximity of the low voltage battery 51 thereby to enhance the maintenance performance and facilitate an operation of mounting and removing the low voltage battery 51 while the fuse box 159 is retained.

A seal face 160 which contacts in face with the cover plate 148 to exhibit a waterproof property and so forth is provided around a threaded hole 149a into which a screw member 149 for securing the cover plate 148 is to be screwed. At a portion of the seal face 160 on the vehicle body front side of the fuse box 159, a recessed portion 161 for passing the control unit connecting harness 83 therethrough is formed.

A first drain hole 191 for discharging water admitted in the inside of the battery accommodating recessed portion 50a is provided at a position of the bottom of the battery accommodating recessed portion 50a displaced leftwardly in the vehicle widthwise direction and forwardly. Further, a second drain hole 192 is provided also in the bottom between the fuse box 159 and the partition plate 158. Consequently, even if water or the like should enter the control unit accommodating recessed portion 50b, it is discharged rapidly through the first drain hole 191 of the battery accommodating recessed portion 50a formed continuously with the control unit accommodating recessed portion 50b at a position lower than the control unit accommodating recessed portion 50b. Further, if water enters the attachment bottom of the fuse box 159, then it can be discharged from the second drain hole 192. It is to be noted that, in the case where the side stand 20 is attached to the right side in the vehicle widthwise direction, the first drain hole 191 can be provided rather near to the right side in the vehicle widthwise direction.

The control unit connecting harness 83 laid to the front side of the vehicle body past an upper portion of the fuse box 159 and the connection harness 82 led out from the control unit 80 are connected to each other by the coupler 81 positioned on the vehicle body front side of the control unit 80. The coupler 81 is covered with a coupler cover 190 made of rubber. In particular, the coupler 81 is disposed in the proximity of the face on the vehicle body front side of the control unit 80, and the control unit connecting harness 83 connected by the connector provided on one end of the connection harness 82 and extending rearwardly past sidewardly of the low voltage battery 51 is led out to the outside of the accommodating box 49 together with a wiring line connecting to the low voltage battery 51. Therefore, the control unit connecting harness 83 can be wired collectively in a high space efficiency in the accommodating box 49.

With such a control box accommodation structure as described above, since the control unit 80 is accommodated in the control unit accommodating recessed portion 50b provided on the bottom of the accommodating box 49, the control unit 80 can be protected effectively against an impact from the outside while an influence of rain and so forth is prevented from being had on the control unit 80. Further, since the control unit 80 is covered from above by a cover plate 84 in the accommodating box 49, placement of some other accommodation article from and into the accommodating box 49 is facilitated, and interference of some other accommodation article with the control unit 80 can be prevented advantageously.

Further, since the low voltage battery 51 is accommodated in the battery accommodating recessed portion 50a connecting to the control unit accommodating recessed portion 50b, the low voltage battery 51 is disposed in the proximity of the control unit 80, and consequently, assurance of the power supply is facilitated and it is made possible to directly connect the control unit 80 to the low voltage battery 51 to achieve enhancement of the wiring efficiency. Further, since the low voltage battery 51 is disposed such that the terminals 155 and 156 are positioned at an upper portion thereof, even if water or the like should flow into the battery accommodating recessed portion 50a, an influence of the water or the like upon the terminals 155 and 156 can be avoided.

Furthermore, since part of the rear frame 40 and the control unit accommodating recessed portion 50b are disposed in an overlapping relationship with each other as viewed in side elevation and the first cross pipe 59 disposed between a lowermost portion of the battery accommodating recessed portion 50a and the cover plate 148 in the upward and downward direction is provided to extend between the rear frames 40, the control unit accommodating recessed portion 50b is surrounded by the rear frames 40 and the first cross pipe 59. Consequently, an influence from the outside can be further suppressed from being had on the control unit 80.

As seen in the figure, the accommodating box 49 is disposed so as to be positioned at the center of the vehicle body center line C. On the other hand, the control unit 80 and the low voltage battery 51 are disposed in an offset relationship to the right side in the vehicle widthwise direction with respect to the vehicle body center line C in order to correct the position of the center of gravity, which is displaced to the left side of the vehicle body, because the electric motor M and so forth are built in the arm portion of the swing arm 21 of the cantilever type. Details of the relationship between the dispositional position of the control unit 80 and the low voltage battery 51 and the position of the center of gravity of the vehicle body are hereinafter described.

Figure 15:
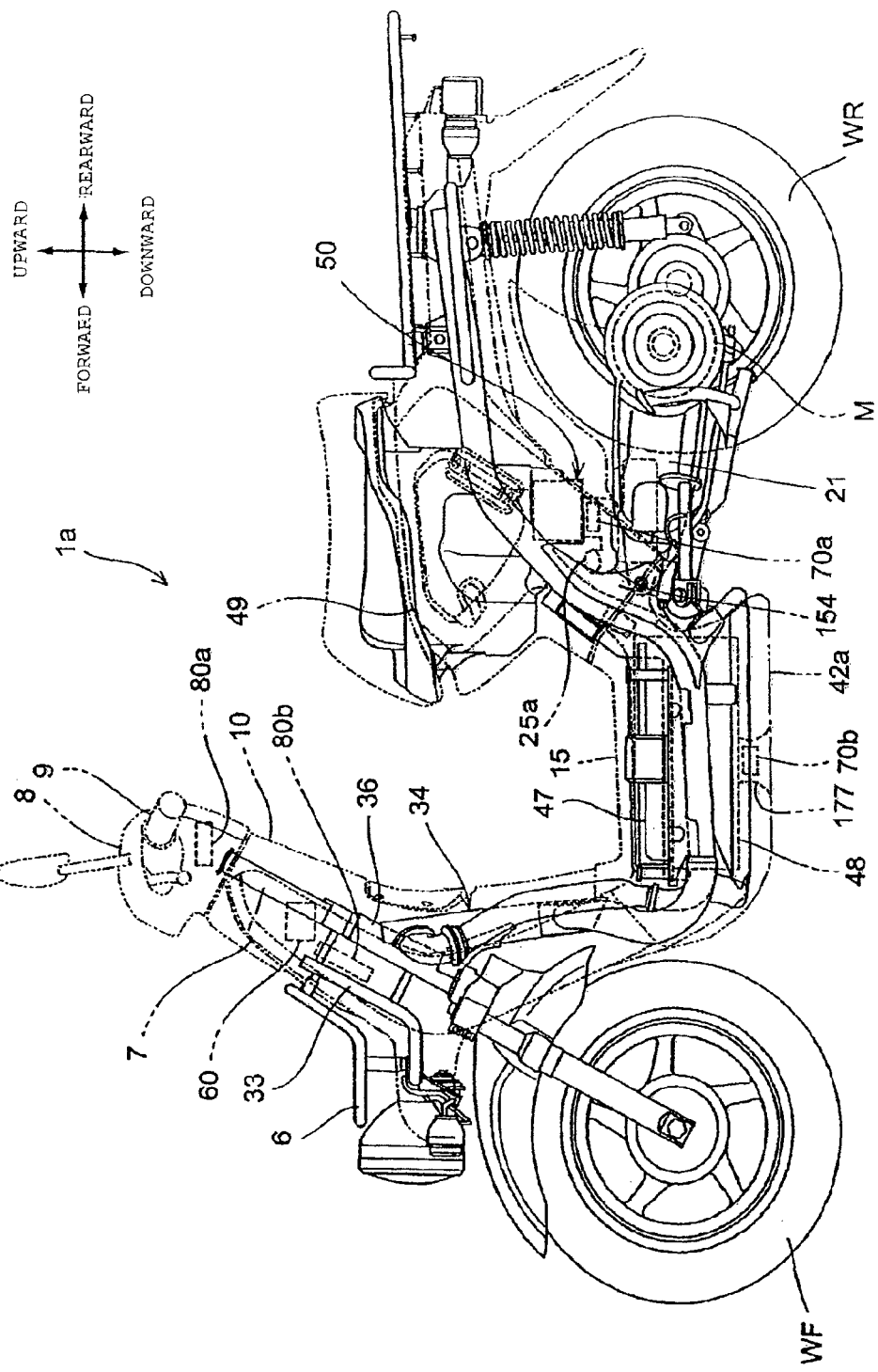
FIG. 15 is a side elevational view of an electric motorcycle to which an approach notification control apparatus according to a second embodiment of the present invention is applied.

FIG. 15 is a side elevational view of an electric motorcycle 1a to which an approach notification control apparatus according to a second embodiment of the present invention is applied. Like reference characters to those described hereinabove denote like or equivalent elements. The present embodiment is characterized in that the disposition of the second speaker and the control unit is different. Since FIG. 15 is similar to FIG. 1 except the disposition of the second speaker and the control unit, description of similar portions is omitted.

The second speaker 70a is disposed at a lower portion of the accommodating recess 50 projecting downwardly from the accommodating box 49 such that the sound emitting direction is directed downwardly. In this instance, a sound guiding duct 154 for introducing notification sound outputted from the second speaker 70a to a sideward direction of the vehicle body is provided. Notification sound introduced by the sound guiding duct 154 is emitted leftwardly and rightwardly in the vehicle widthwise direction from through-holes 25a formed in the left and right side covers 25 in the vehicle widthwise direction.

Further, as a modification to the dispositional position, the second speaker 70b can be disposed on a lower face of the battery case 47 of the high voltage battery 48 disposed below the low floor 15 such that the sound emitting direction thereof is directed downwardly. In this instance, a sound guiding duct 177 of a megaphone shape or a horn shape for diffusing notification sound outputted from the second speaker 70b is provided. The sound guiding duct 177 is configured such that the lower face thereof is positioned substantially in flush with the lower face of an undercover 42a.

The control unit 80a can be disposed in the inside of the handle cover 8 below the right side handle pipe 135 utilizing a free space assured because a starter button for an engine becomes unnecessary. Further, the control unit 80b can be disposed at a position on the rear face side of the front stay 33 below the speaker 60.

Figure 16:
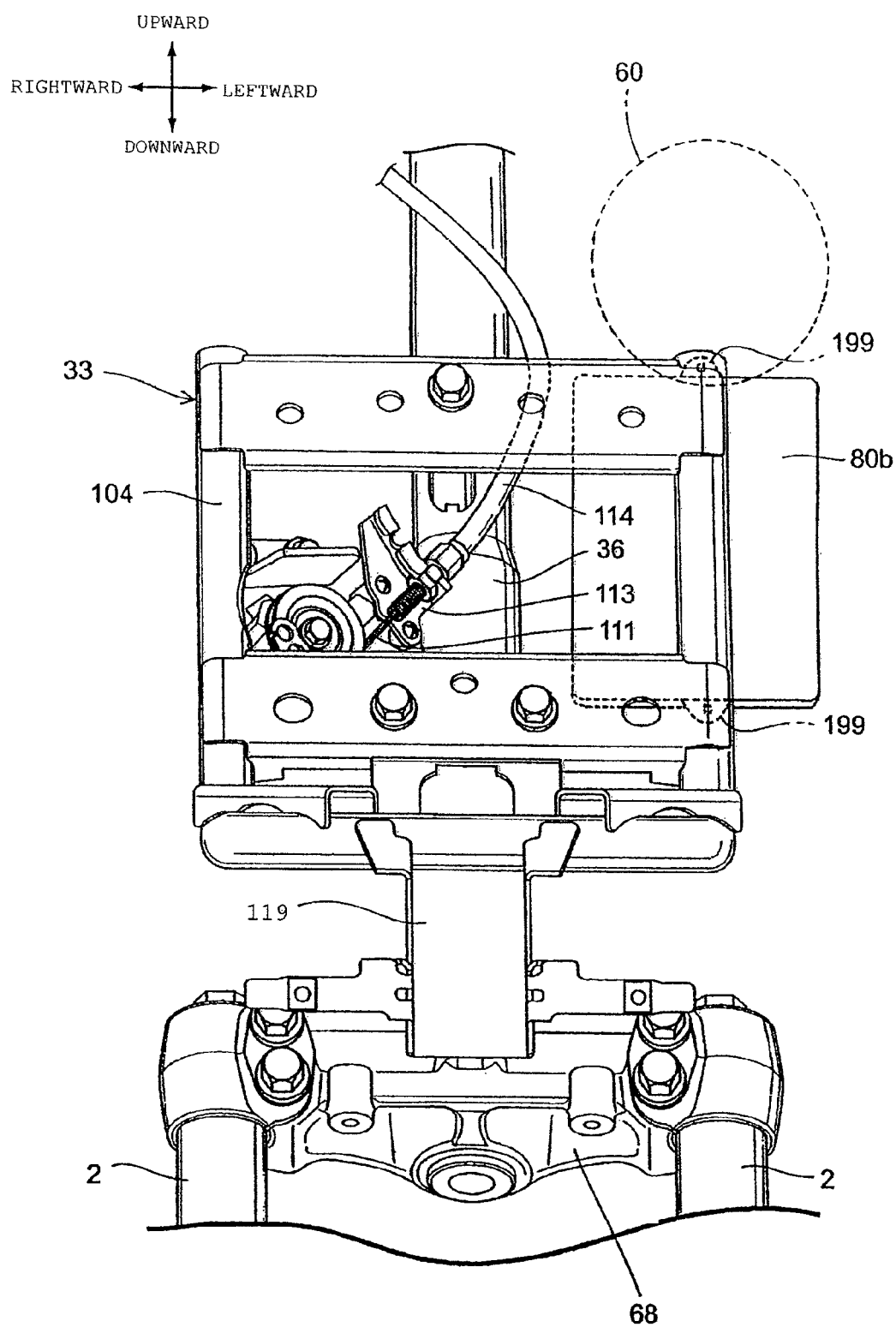
FIG. 16 is an enlarged front elevational view around a front stay according to the second embodiment of the present invention.

FIG. 16 is an enlarged front elevational view around the front stay 33 according to the second embodiment of the present invention. Like reference characters to those described hereinabove denote like or equivalent elements. This figure shows an attachment structure of the control unit 80b disposed at a position on the rear face side of the front stay 33 below the speaker 60. Since FIG. 16 is similar to FIG. 9 except the attachment structure of the control unit 80b, description of similar portions is omitted.

The control unit 80b can be secured to the upright frame portion 104 on the right side in the vehicle widthwise direction of the front stay 33 utilizing flanges 199 formed at upper and lower end portions thereof. According to such an attachment structure as just described, also when external force is applied to the front carrier 6 or the like, the external force can be prevented from having an influence on the control unit 80b. Further, since the speaker 60 and the control unit 80b are disposed in the proximity of each other, in the case where the approach notification control apparatus is set as an optional part, an attaching operation of the approach notification control apparatus to the vehicle body can be carried out at a time only by removing the front cover 7. Further, with this disposition, also it is possible to form the speaker 60 and the control unit 80b as a unitary part to further simplify the attaching operation of the approach control notification apparatus.

Figure 17:
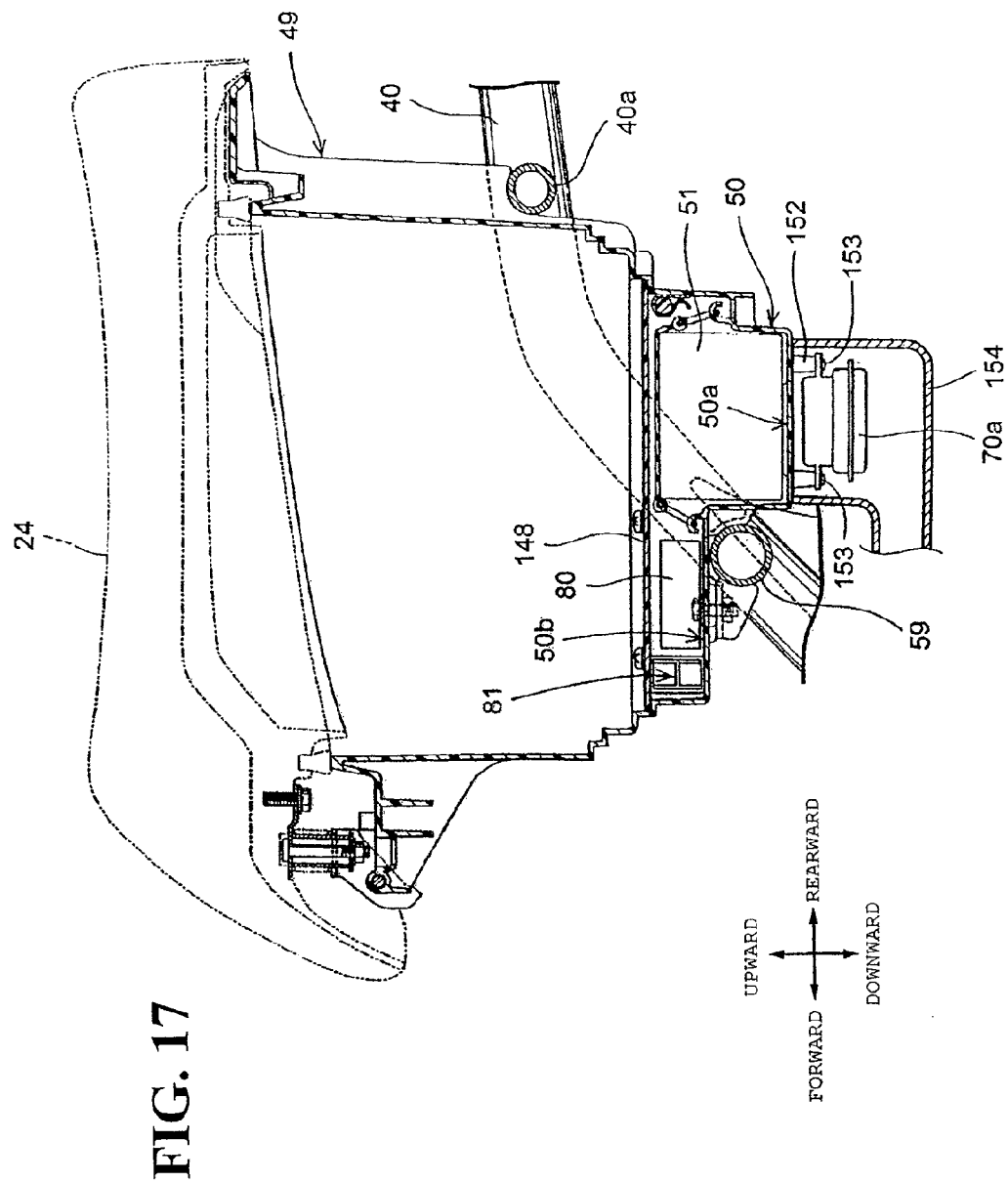
FIG. 17 is a partial sectional side elevational view showing a configuration around an accommodation box according to the second embodiment of the present invention.

FIG. 17 is a partial sectional side elevational view showing a configuration around the accommodating box 49 according to the second embodiment of the present invention. Like reference characters to those described hereinabove denote like or equivalent elements. This figure shows an attachment structure of the second speaker 70a disposed at a lower portion of the accommodating recess 50 projecting downwardly from the accommodating box 49 such that the sound emitting direction thereof is directed downwardly. Since FIG. 17 is similar to FIG. 13 except the attaching structure of the second speaker 70a, description of similar portions is omitted.

In the present embodiment, the second speaker 70a is attached using bosses 152 formed on a lower face of the battery accommodating recessed portion 50a and screw members 153 such that the sound emitting direction thereof is directed downwardly of the vehicle body. The second speaker 70a is disposed at the center in the vehicle widthwise direction, and the sound guiding duct 154 for guiding notification sound outputted from the second speaker 70a to a sideward direction of the vehicle body is provided.

Figure 18:
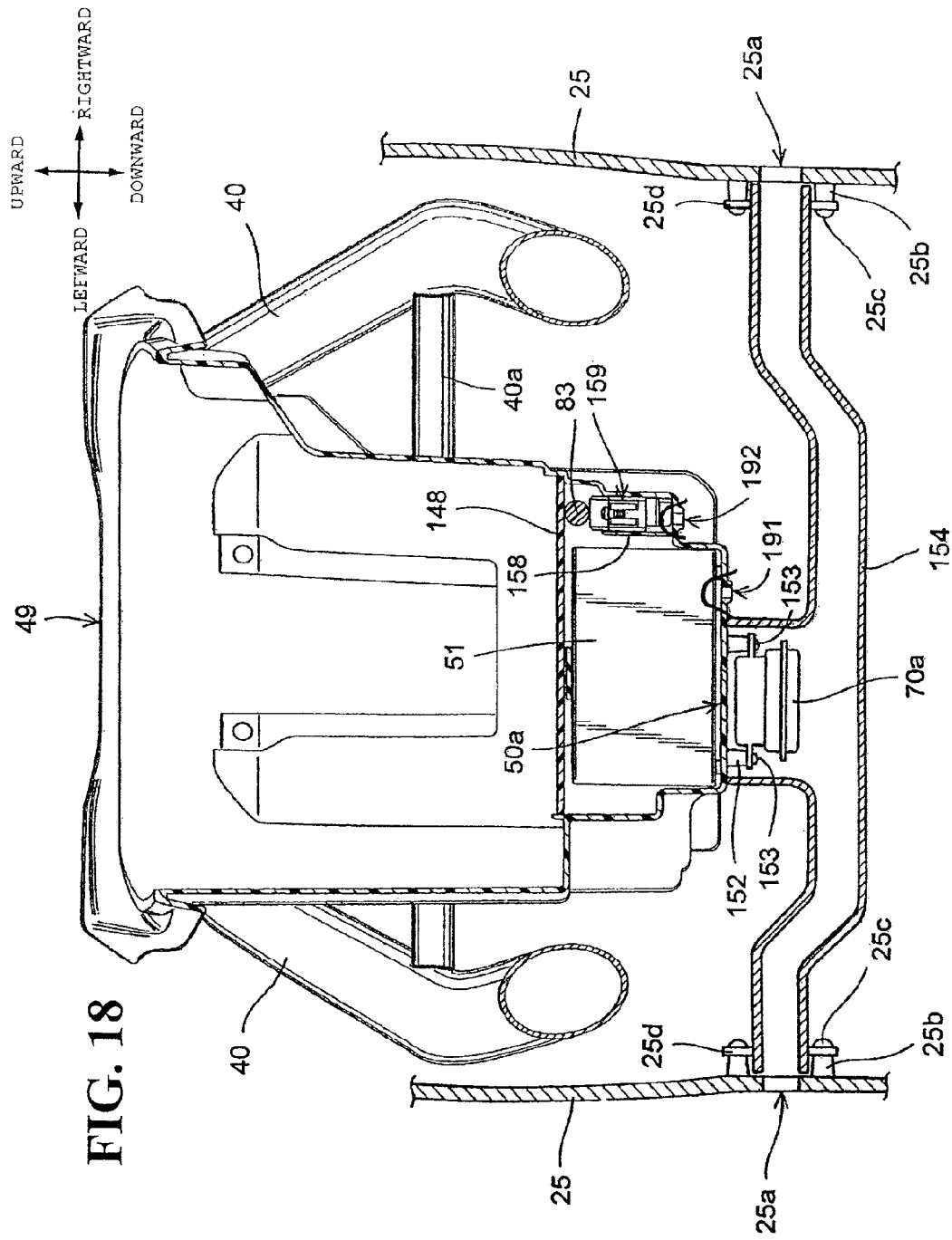
FIG. 18 is a partial sectional side elevational view showing a configuration around the accommodation box according to the second embodiment of the present invention.
Figure 19:
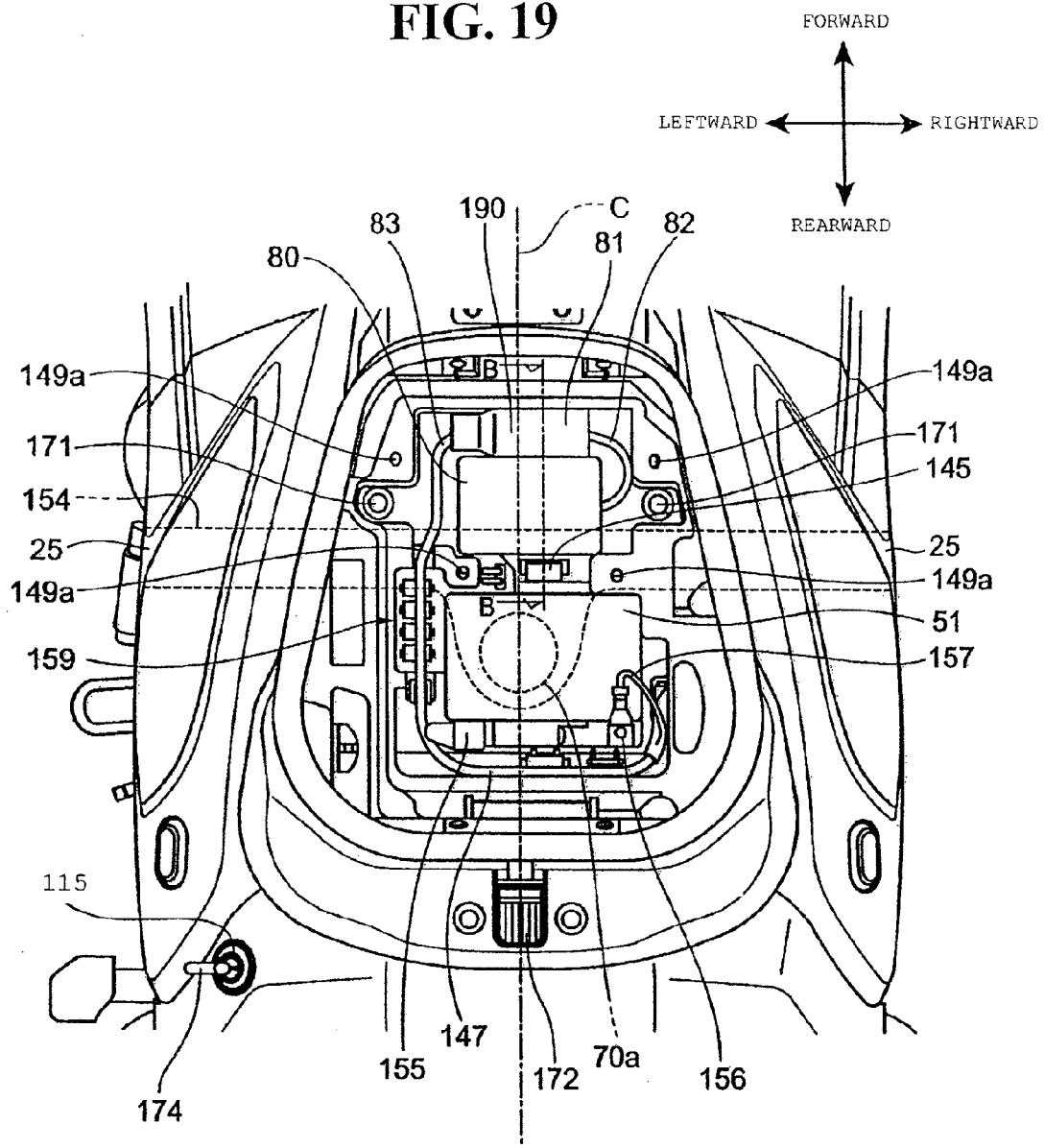
FIG. 19 is a top plan view showing a configuration around the accommodation box according to the second embodiment of the present invention.

FIGS. 18 and 19 are a partial sectional front elevational view and a top plan view, respectively, showing a configuration around the accommodating box 49 according to the second embodiment of the present invention. Like reference characters to those described hereinabove denote like or equivalent elements. The second speaker 70a is attached to a lower face of the battery accommodating recessed portion 50a.

The sound guiding duct 154 formed from a pipe-like member is provided around the second speaker 70a, and notification sound outputted from the second speaker 70a is introduced in the leftward and rightward directions of the vehicle though the sound guiding duct 154 and emitted sidewardly of the vehicle body from a through-hole 25a formed in each of a pair of left and right side covers 25 disposed at a lower portion of the seat 24. A flange 25d is formed at each of end portions of the sound guiding duct 154, and the flanges 25d and the side covers 25 are secured to each other using bosses 25b formed on the rear face side of the side covers 25 and screw members 25c.

With such an attachment structure for the second speaker 70a as described above, the second speaker 70a is attached making use of a dead space which is a lower portion of the battery accommodating recessed portion 50a and it is possible to emit notification sound from the second speaker 70a in the leftward and rightward directions of the vehicle body. Further, with such a sound guiding duct 157 as described above, since the sound emitting direction of the second speaker 70a can be changed arbitrarily, the degree of freedom in disposition of the second speaker is enhanced.

Referring to FIG. 19, on the side covers 25 on the left side in the vehicle widthwise direction, a key cylinder 115 for unlocking the seat 24 by a turning operation of a main key 174 is disposed. A lock mechanism 172 provided at a rear end of the accommodating box 49 is configured such that, if the main key 174 is turned, then the lock mechanism 172 releases a hook (not shown) secured to a lower face of the seat 24. This figure illustrates a state in which the cover plate 148 attached to an upper portion of the low voltage battery 51 is removed. Around each of screw members 171 for securing the accommodating box 49 to the first cross pipe 59 (refer to FIG. 17), a portion around the threaded hole 149a for attaching the cover plate 148 is formed in a flat shape so that it can contact closely with the cover plate 148 thereby to exhibit a sealing property.

Figure 20:
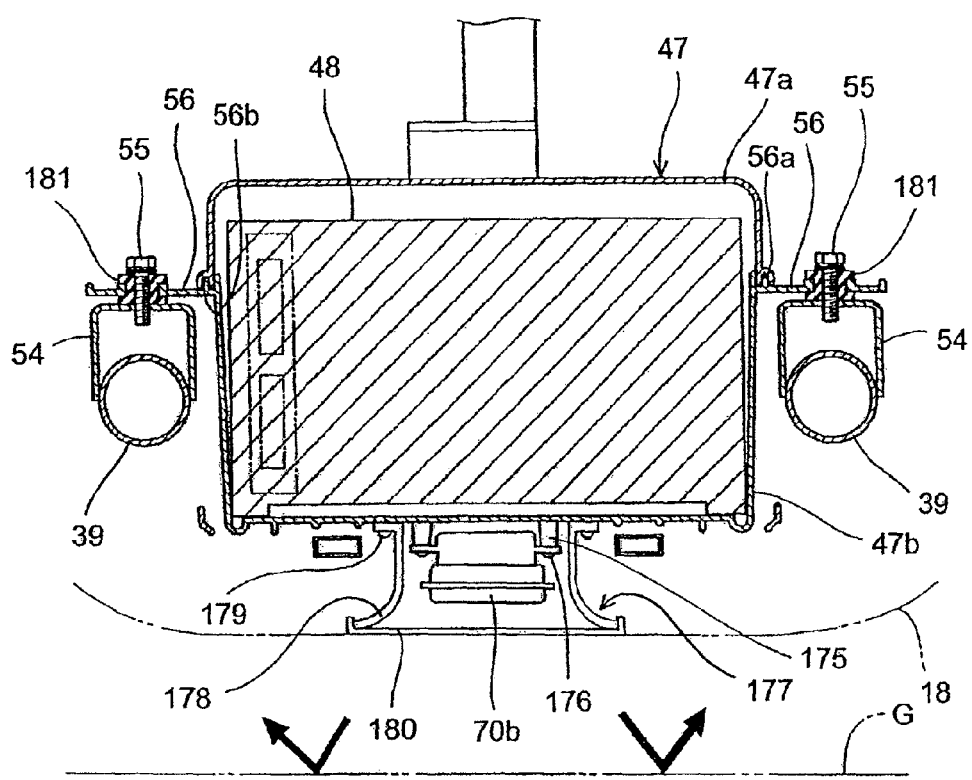
FIG. 20 is a partial sectional front elevational view showing a configuration around a battery case according to the second embodiment of the present invention.

FIG. 20 is a partial sectional front elevational view showing a configuration around a battery case 47 according to a modification to the second embodiment of the present invention. Like reference characters to those described hereinabove denote like or equivalent elements. This figure shows a section of the battery case 47 as viewed from forwardly of the vehicle body. A fitting rib 56a is formed on a circumferential edge of an upper opening of the case main body 47b. A fitting groove 56b is formed on an opening edge of the lid 47a. By fitting them with each other, water immersion from the joining portion between the case main body 47b and the lid 47a is prevented thereby to assure a watertight property. It is to be noted that the flange portion 56 formed on the circumferential edge of the opening of the case main body 47b is secured to the side bracket 54 by bolts 55.

In the present modification, the second speaker 70b is attached using bosses 175 formed on the bottom face of the case main body 47*b* and screw members 176 such that the sound emitting direction thereof is directed downwardly of the vehicle body. The second speaker 70*b* is disposed substantially centrally in the vehicle widthwise direction at a position near to the road surface G. The sound guiding duct 177 of a megaphone shape or a horn shape is disposed around the second speaker 70*b*. The sound guiding duct 177 is formed from a tubular member 178 secured to the bottom face of the case main body 47*b* by screw members 179 and formed such that the opening area thereof increases toward a downward direction. A net plate 180 for reducing the influence of sand and so forth upon the second speaker 70*b*.

With the disposition of the second speaker 70*b* described above, the second speaker 70*b* can be attached making effective use of a dead space which is a lower portion of the battery case 47. Further, since the sound guiding duct 177 of a horn shape is used, sound emitted toward the ground face can be diffused widely together with reflection by the road surface. Furthermore, the battery case 47 having a wide bottom face serves as a good plane of vibration, and a sufficient sound emitting function can be obtained even by a small-sized speaker.

Figure 21:
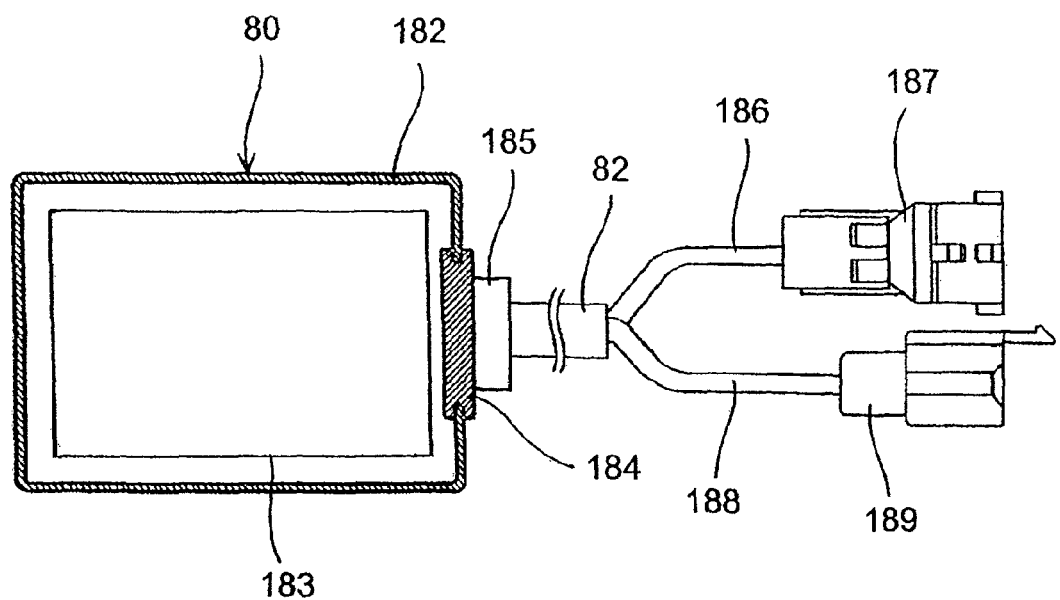
FIG. 21 is a partial sectional top plan view of a control unit.

FIG. 21 is a partial sectional top plan view of the control unit 80. The control unit 80 is configured such that a wiring board 185 is attached to a case 182, in which a control board 183 is accommodated, through a waterproof grommet 184. The connection harness 82 connected to the control board 183 extends through the wiring board 185. The connection harness 82 is formed from a first wiring line 186 to which a first coupler 187 is connected, and a second wiring line 188 to which a second coupler 189 is connected.

Figure 22:
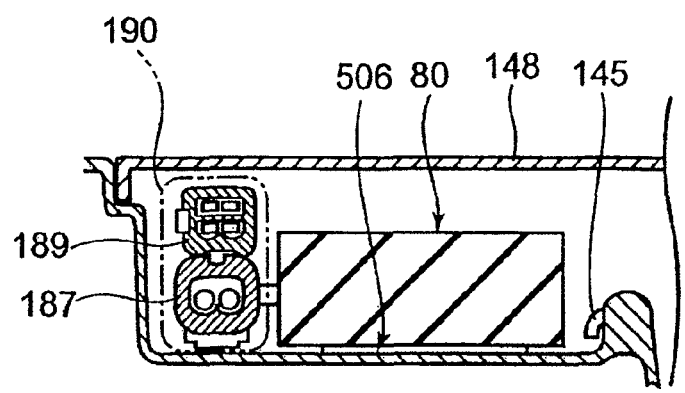
FIG. 22 is a sectional view taken along line B-B of FIG. 19

FIG. 22 is a sectional view taken along line B-B of FIG. 19. The first coupler 187 and the second coupler 189 are disposed such that they overlap with each other in the upward and downward direction at a position forwardly of the vehicle body with respect to the control unit 80. And, the first coupler 187 and the second coupler 189 are covered with the single coupler cover 190. It is to be noted that, in the present embodiment, a two-pin type part is used for the first coupler 187 and a four-pin type part is used for the second coupler 189.

Figure 23:
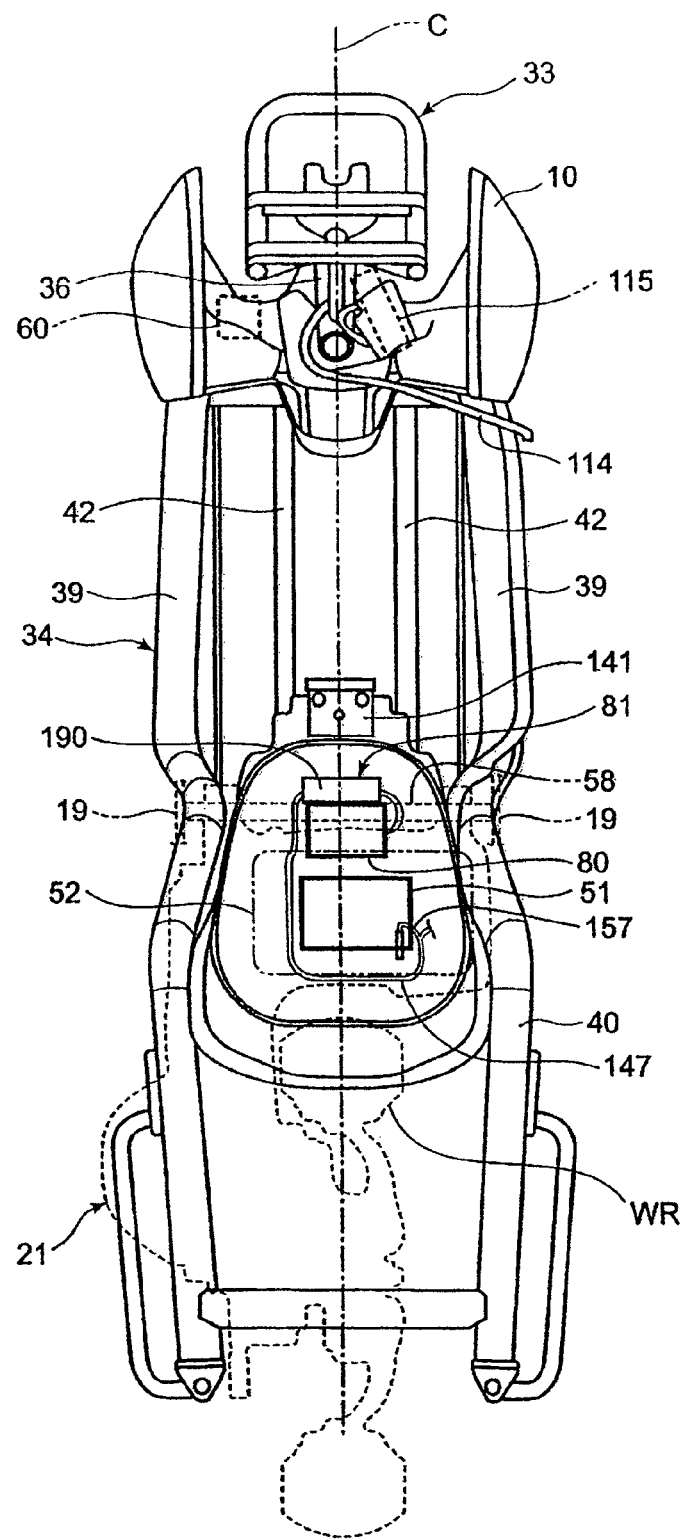
FIG. 23 is a top plan view showing a configuration of a vehicle body of an electric motorcycle

FIG. 23 is a top plan view showing a vehicle body configuration of the electric motorcycle 1. Like reference characters to those described hereinabove denote like or equivalent elements. The leg shield 10 extends forwardly of the head pipe 36 in such a manner as to cover the head pipe 36 from sidewardly. The opposite side edges of the leg shield 10 are provided contiguously to the opposite side edges of the front cover 7 at left and right positions in the vehicle body widthwise direction of the front stay 33. By such a configuration as just described, miniaturization of the front cover 7 can be achieved. The speaker 60 is disposed on the left side in the vehicle widthwise direction of the head pipe 36, and the key cylinder 115 is disposed on the right side in the vehicle widthwise direction across the head pipe 36.

The swing arm 21 according to the present embodiment is of the cantilever type which supports the rear wheel WR only by the arm on the left side of the vehicle body. Then, since the electric motor M, a speed reduction mechanism and so forth are built in the inside of the cantilever arm, the position of the center of gravity of a rear portion of the vehicle body is likely to be displaced to the left side of the vehicle body. Therefore, in the present embodiment, not only the PDU 52 disposed in the proximity of the pivot shaft 58 is disposed in an offset relationship to the right side of the vehicle body with respect to the vehicle body center line C but also the low voltage battery 51 and the control unit 80 are disposed in an offset relationship to the right side of the vehicle body so that a balance of the position of the center of gravity in the leftward and rightward direction can be established. Further, also where the control unit 80*a* is disposed in the proximity of the steering handle member 9 on the right side as shown in FIG. 12, an effect of achieving a left and right balance of the position of the center of gravity can be obtained.

Figure 24:
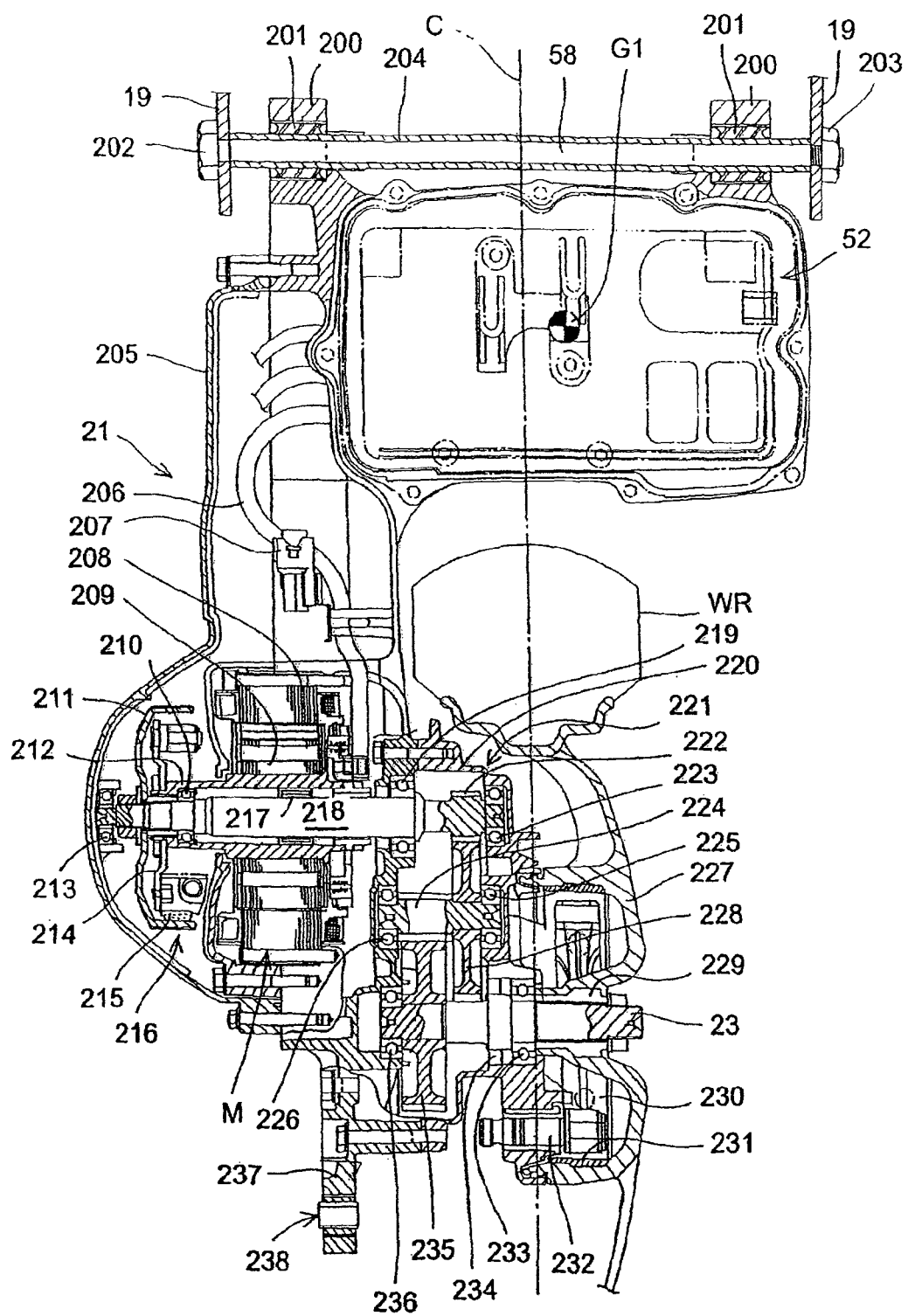
FIG. 24 is a sectional view of a swing arm as viewed from above the vehicle body

FIG. 24 is a sectional view of the swing arm 21 as viewed from above the vehicle body. Like reference characters to those described hereinabove denote like or equivalent elements. The swing arm 21 is supported for rocking motion on a pair of left and right pivot plates 19 through the swing arm pivot 58 (pivot shaft). The pivot shaft 58 is an elongated bolt having a screw head 202 and is fitted in a cylindrical collar 204 supported by bosses 200 on the swing arm 21 side through bushes 201 and secured by a nut 203 on the right side in the vehicle widthwise direction. It is to be noted that the bushes 201 are thermally secured to the cylindrical collar 204, and a collar member of a small thickness is thermally secured to the outer periphery side of each of the bushes 201. Then, the collar members and the bushes 201 are force fitted into through-holes of the bosses 200 to define the position of the swing arm 21 in the vehicle widthwise direction.

The PDU 52 is accommodated in a large width case section forwardly of the rear wheel WR. Consequently, the PDU 52 is disposed rather forwardly of the swing arm 21 in such a manner as to cross the vehicle body center line C, which passes the front and rear wheels of the electric motorcycle 1, in the vehicle widthwise direction. As described hereinabove, in the electric motorcycle 1, one-sidedness of the weight balance in the vehicle widthwise direction by offset disposition of the electric motor M to the left side in the vehicle widthwise direction is corrected by figuring out the disposition of the PDU 52 as described hereinabove. As seen in the figure, the position G1 of the center of gravity of the PDU 52 is positioned on the right side in the vehicle widthwise direction with respect to the vehicle body center line C.

The swing arm 21 according to the present embodiment is of the cantilever type, which supports the rear wheel WR for rotation only by the arm section on the left side. The electric motor M, a centrifugal clutch 216 as a clutching mechanism for rotational driving force, and a speed reducing mechanism 221 are disposed in a concentrated manner at a position on the vehicle body rear side of the arm section.

The electric motor M is of the inner rotor type which is formed from a stator 208 secured to an inner wall of the swing arm 21 and having a stator coil, and a rotor 209 secured to a motor driving shaft 212. The centrifugal clutch 216 is configured from a drive plate 214 on which a clutch shoe 215 is provided, and a clutch outer 211 for being driven by frictional resisting force of the clutch shoe 215. The drive plate 214 is secured to a left side end portion in the figure of the motor driving shaft 212, and the motor driving shaft 212 is secured to an output power shaft 218 which is fitted rotatably with the motor driving shaft 212. It is to be noted that the motor driving shaft 212 and the output power shaft 218 are configured for rotation relative to each other by a needle roller bearing 217 and a ball bearing 210.

Then, the centrifugal clutch 216 is configured such that, if the speed of rotation of the motor driving shaft 212 becomes higher than a predetermined speed, that is, if the speed of rotation of the drive plate 214 becomes higher than a predetermined speed, then the clutch shoe 215 moves to the outer side in a diametrical direction to generate frictional resisting force so that the clutch outer 211 is driven to rotate. Consequently, the rotational driving force of the electric motor M is transmitted to the output power shaft 218. It is to be noted that a left side end portion in the vehicle widthwise direction of the output power shaft 218 is supported for rotation by a bearing 213 fitted in a swing arm cover 205. The right side in the vehicle widthwise direction of the output power shaft 218 is supported for rotation by a bearing 219 fitted in a driving case 237 and a bearing 223 fitted in a reduction gear case 220. At a vehicle body rear end portion of the driving case 237, a supporting hole 238 for the rear cushion unit 31 is formed. An output wiring line 206 for the electric motor M and a connector 207 for a motor speed sensor (not shown) are disposed on the vehicle body front side of the electric motor M in a swing arm cover 205.

Rotational driving force transmitted to the output power shaft 218 is transmitted to the final output power shaft (axle) 23 through the speed reducing mechanism 221. More particularly, the rotational driving force is transmitted to the final output power shaft 23, which is rotatably supported by a bearing 236 secured to a second speed reducing gear wheel 235 and fitted in the driving case 237 and another bearing 233 fitted in the reduction gear case 220, through a first speed reducing gear wheel 228 which meshes with a speed reducing gear wheel 222 formed at a right side end portion in the figure of the output power shaft 218, a first speed reducing shaft 224 rotatably supported by a bearing 225 secured to the first speed reducing gear wheel 228 and fitted in the reduction gear case 220 and another bearing 226 fitted with the driving case 237, and a second speed reducing gear wheel 235 which meshes with a speed reduction gear wheel formed on the first speed reducing shaft 224.

A wheel 227 of the rear wheel WR is secured to a right side end portion in the figure of the final output power shaft 23 with a collar 229 interposed therebetween. A brake drum having a liner 231 is formed on the inner diameter side of the wheel 227. A pair of upper and lower brake shoes 230 which are driven by a brake cam 232 around an axis provided by an anchor pin (not shown) are accommodated in the inner side of the brake drum. It is to be noted that an oil seal 234 is disposed on the rear side in the figure of the bearing 233.

Figure 25:
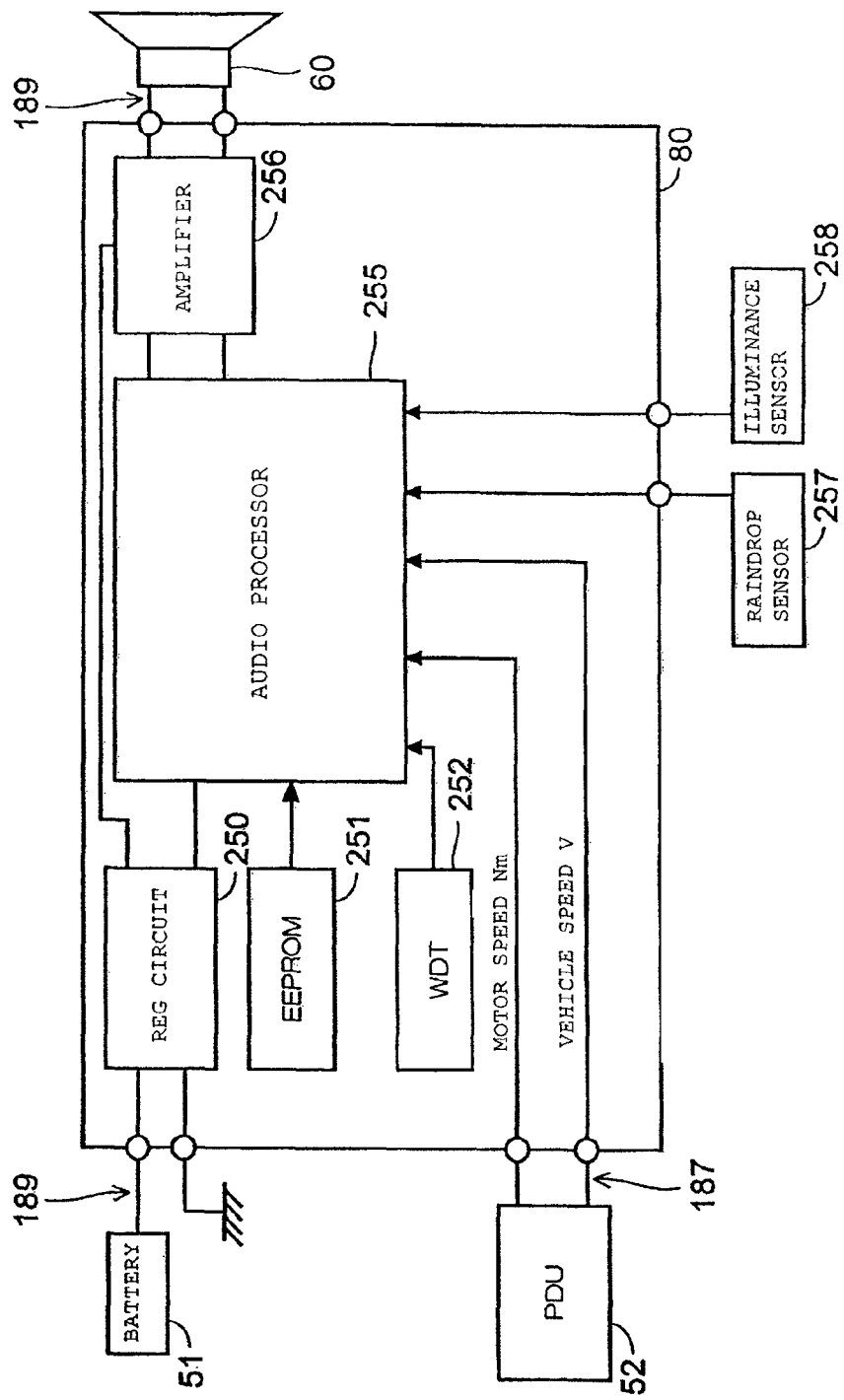
FIG. 25 is a block diagram showing a configuration of the control unit

FIG. 25 is a block diagram showing a configuration of the control unit 80. The control unit 80 includes a REG (regulator) circuit 250, an EEPROM 251 as pseudo engine sound volume storage means in which sound sources and sound volumes of engine sound and so forth of engine driven vehicles are recorded, a WDT (watch dog timer) 252 for maintaining normal operation of the system, an audio processor 255, and an amplifier 256.

To the control unit 80, information from the PDU 52 is inputted through the first coupler 187. Further, to the REG circuit 250 of the control unit 80, the low voltage battery 51 is connected through the second coupler 189 of the two-pin type. Furthermore, to the amplifier 256 of the control unit 80, the speaker 60 is connected through the second coupler 189. To the audio processor 255, output information of the EEPROM 251 and the WDT 252 and a motor speed Nm and a vehicle speed V inputted from the PDU 52 are inputted.

The audio processor 255 calls a predetermined sound source from the EEPROM 251 based on information of the motor speed Nm and the vehicle speed V and outputs notification sound with a predetermined sound volume from the speaker 60 (and various second speakers) through the amplifier 256.

It is to be noted that, while, in this figure, an input portion from the low voltage battery 51 and an output portion from the amplifier 256 are shown separately from each other, both portions are collected to the second coupler 189 of the four-pin type. Further, to the audio processor 255, output information from a raindrop sensor 257 and an illuminance sensor 258 can be inputted further. In this instance, this can be coped with, for example, by changing the second coupler 189 of the 4-pin type to that of the 6-pin type.

If it is detected by the raindrop sensor 257 that it is raining, then the audio processor 255 can increase the sound volume of notification sound from that in a normal state so that the perception effect of the notification sound may not be reduced by the sound of the rain. On the other hand, if it is detected by the illuminance sensor 258 that it is nighttime, then the audio processor 255 can set the sound volume of the notification sound so as to be lower than that in a normal state. Also it is possible to apply a noise sensor or the like such that the sound volume of the notification sound is set so as to increase when the environmental noise is high, for example, because the traffic amount is great.

Figure 26:
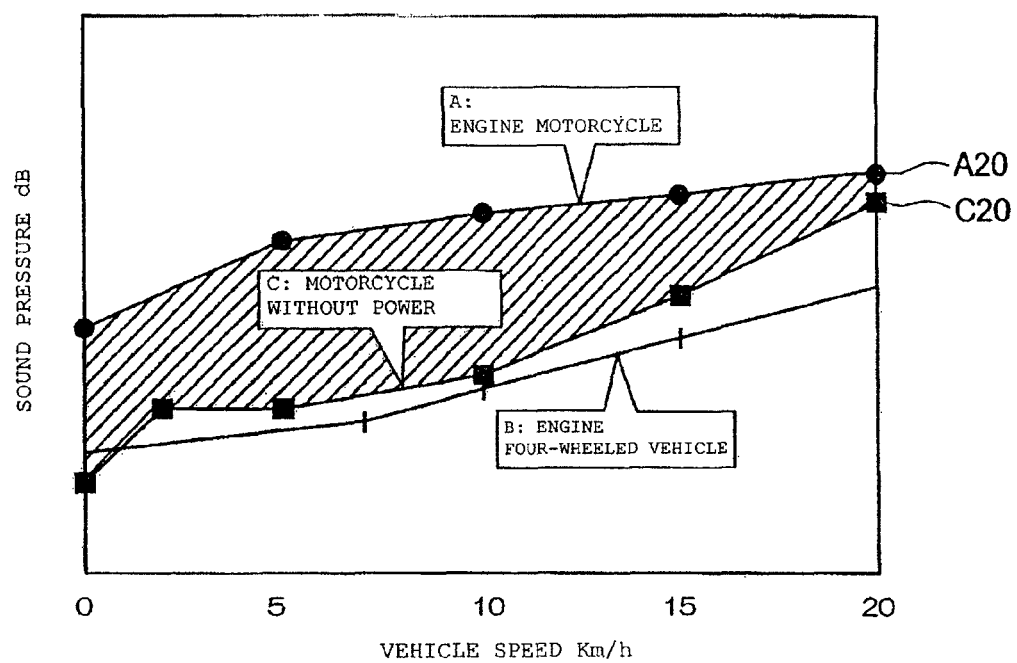
FIG. 26 is a graph illustrating a relationship between the vehicle speed and running sound of various vehicles.

FIG. 26 is a graph illustrating a relationship between the vehicle speed and the running sound in various vehicles. In this graph, A as an engine driven vehicle, B as an engine four-wheeled car, and C as a motorcycle without power are illustrated. In the case where the engine driven motorcycle and the engine four-wheeled car are compared with each other, the engine driven motorcycle which exhibits a high engine speed upon low speed running because the total engine displacement volume is small and wherein the engine is exposed outwardly of the vehicle body exhibits a generally high sound pressure level (sound volume).

Meanwhile, the data of the motorcycle without power represented by C indicate a sound volume in the case where a vehicle for a test having no engine as a power source is driven. If attention is paid to the data of the motorcycle without power, running sound whose level a little exceeds that of the engine four-wheeled car immediately after starting thereof begins to indicate increase of the difference thereof after the vehicle speed exceeds 10 km/h. Then, at the vehicle speed of 20 km/h, the running sound comes to C20 which is a little lower than A20 of the engine driven motorcycle. In other words, the ratio in engine sound in the overall running sound decreases as the vehicle speed increases, and at the vehicle speed of 20 km/h, the influence of presence/absence of engine sound to be had on the running sound is small.

From the foregoing, in the approach notification control apparatus according to the present embodiment, the notification sound is set such that it is outputted from the speaker with such a sound volume that a slanting line portion representing the difference between the motorcycle without power of C and the engine driven motorcycle of A may be filled up in order to implement running sound equivalent to that of the engine driven motorcycle. Further, the notification sound from the speaker is set such that it is not outputted if the vehicle speed exceeds 20 km/h.

Figure 27:
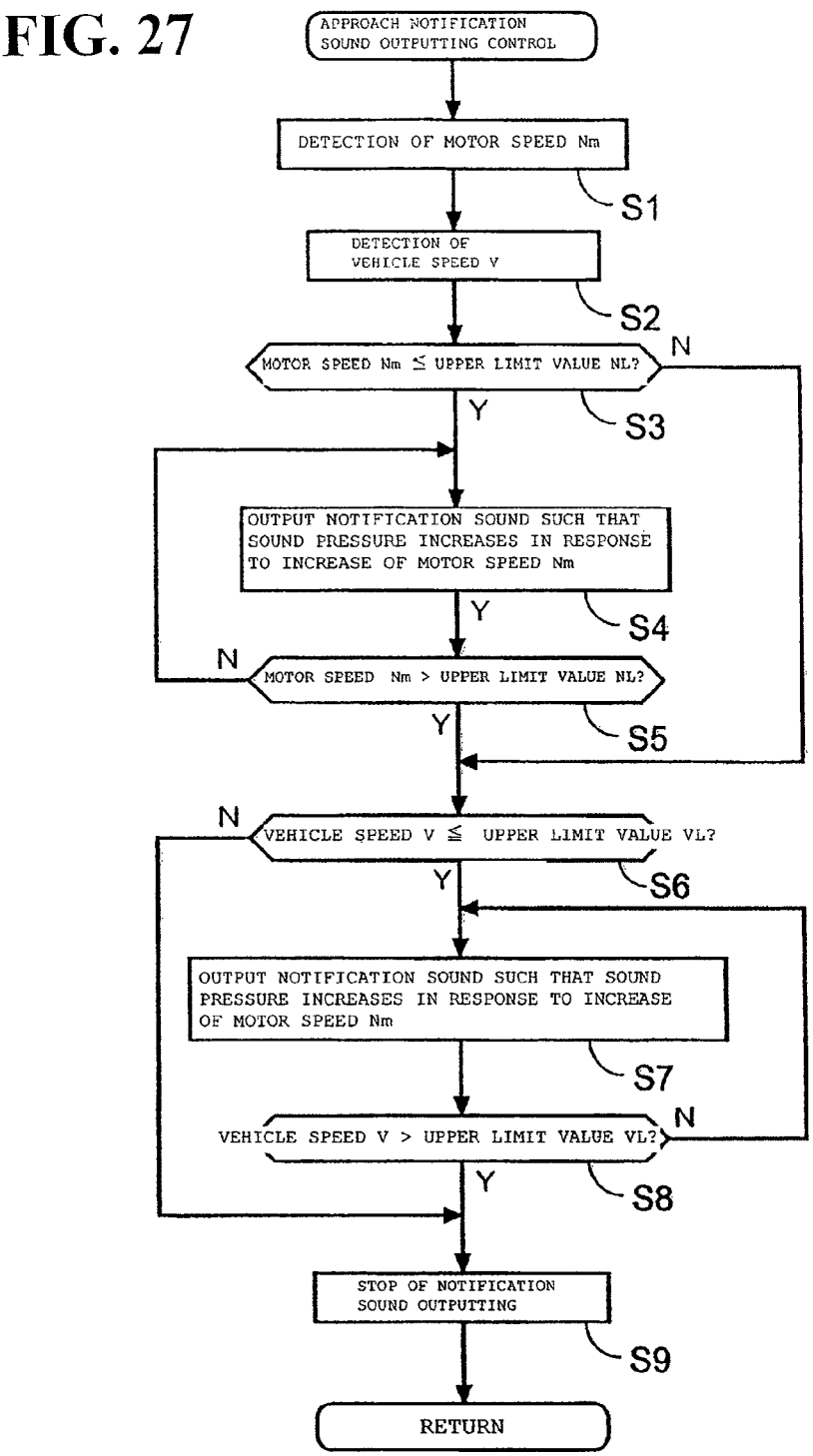
FIG. 27 is a flow chart illustrating a procedure of approach notification sound output control.

FIG. 27 is a flow chart illustrating a procedure of approach notification sound outputting control. At step S1, the motor speed Nm is detected based on information from the PDU 52, and at step S2, the vehicle speed V is detected based on the information from the PDU 52. At step S3, it is decided whether or not the motor speed Nm is equal to or lower than an upper limit value NL. This upper limit value NL is set to a connection speed of the centrifugal clutch 216 (refer to FIG. 24) disposed on the output transmission route of the electric motor M.

At step S4, notification sound is outputted from the speaker 60 such that the sound volume thereof increases in response to the increase of the motor speed Nm. Then at step S5, it is decided whether or not the motor speed Nm exceeds the upper limit value NL, and if an affirmative decision is made, then the processing advances to step S6, but if a negative decision is made, then the processing returns to step S4. In other words, in a non-running state before the centrifugal clutch is connected, the notification sound is outputted such that it increases in response to the speed of rotation of the electric motor M.

At step S6, it is decided whether or not the vehicle speed V is equal to or lower than an upper limit value VL. In the present embodiment, the upper limit value VL is set to the vehicle speed of 20 km/h. If an affirmative decision is made at step S6, then the processing advances to step S7, at which the notification sound is outputted such that the difference of the sound volume thereof from a target sound volume may be filled up in response to increase of the vehicle speed V. In the present embodiment, as illustrated in the graph of FIG. 26, the notification sound is outputted such that the slanting line portion between the motorcycle without power of C and the engine driven motorcycle of A may be filled up.

Sound volumes of notification sound at individual predetermined vehicle speeds can be set in advance as sound volume data in accordance with individual vehicles by an experiment or the like, and the set data can be retained into the EEPROM 251 (refer to FIG. 25) of the control unit 80. In the present embodiment, the sound volume of notification sound is set such that running sound equivalent to that of a vehicle with a prime mover which incorporates a 50-cc engine corresponding to the automobile rank of the electric motorcycle 1 is outputted. However, for example, in the case where the automobile rank of an electric motorcycle corresponds to a motorcycle of a total engine displacement volume greater than 50 cc but smaller than 400 cc, running sound equivalent to that of a motorcycle which incorporates a 400-cc engine can be outputted. It is to be noted that, the relationship between the vehicle rank of an electric motorcycle and the sound volume of notification sound can be set arbitrarily in response to the vehicle category, the license category and so forth in the road traffic act.

Then, at step S8, it is decided whether or not the vehicle speed V exceeds the upper limit value VL, and if an affirmative decision is made, then the processing advances to step S9, at which the outputting of notification sound is stopped, thereby ending the series of controls. It is to be noted that, if a negative decision is made at step S6, then the processing advances to step S9, but if a negative decision is made at step S8, then the processing returns to step S7.

With such approach notification sound outputting control as described above, it is possible to output approach notification sound with a sound volume which conforms to running sound of an actual engine driven vehicle in comparison with such a controlling method that the sound volume is increased merely based on increase of the motor speed or the vehicle speed. In particular, the approach notification sound can be controlled such that running sound equivalent to that of an engine driven vehicle corresponding to the vehicle rank or the vehicle category of the electric motorcycle. Further, the tone of the approach notification sound may be selected from recorded sound data from an engine driven vehicle corresponding to the vehicle rank or the vehicle category of the electric motor or from among various tones of sound.

It is to be noted that the structure, disposition and so forth of the various speakers which output notification sound and the control unit which controls the speakers are not limited to those of the embodiments described above but can be altered in various manners. The approach notification control apparatus according to the present invention can be applied not only to an electric motorcycle but also to various electric vehicles such as three/four-wheeled vehicles of the saddle type and so forth.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle approach notification control apparatus for an electric motorcycle, comprising:
   a sound generation device configured to generate a notification sound that is equivalent to engine sound of an engine driven motorcycle of a vehicle category that is the same as a vehicle category of the electric motorcycle, in response to a motor speed of an electric motor or a vehicle speed; and
   a pseudo engine sound volume storage device configured to store sound volume data of engine sound with respect to the entire running sound upon running of the engine driven motorcycle,
   wherein said sound generation device is controlled based on the sound volume data stored in said pseudo engine sound volume storage device upon low speed running of said electric motorcycle wherein said vehicle approach notification control apparatus further includes a raindrop sensor for detecting a rain amount and an illuminance sensor for detecting brightness; and said vehicle approach notification control apparatus carries out, in the case where a rainfall state is detected by said raindrop sensor, correction for increasing the sound volume of said sound generation means, but carries out, in the case where it is detected by said illuminance sensor that it is nighttime, correction for decreasing the sound volume of said sound generation device.

2. The vehicle approach notification control apparatus for an electric motorcycle according to claim 1, wherein the pseudo engine sound volume data is set so that the sound volume decreases in response to an increase of the vehicle speed and becomes zero when a predetermined vehicle speed is reached.

3. The vehicle approach notification control apparatus for an electric motorcycle according to claim 1, wherein:
   said electric motorcycle includes a centrifugal clutch provided on a driving route for driving a driving wheel from said electric motor; and
   said vehicle approach notification control apparatus controls said sound generation device in response to the motor speed in a state in which the vehicle speed is in the proximity of zero before the speed of said electric motor reaches a connection speed of said centrifugal clutch.

4. The vehicle approach notification control apparatus for an electric motorcycle according to claim 1, wherein the pseudo engine sound volume data is set so as to correspond to engine sound of a maximum total stroke volume of an engine driven vehicle of a vehicle category that is the same as the vehicle category of said electric motorcycle.

5. The vehicle approach notification control apparatus for an electric motorcycle according to claim 1, wherein:
   said vehicle approach notification control apparatus further includes a control unit for controlling the notification sound; and
   said control unit is connected to a horn switch provided on a handle cover, which covers a steering handle member, of said electric motorcycle, and causes, if a switching on operation of said horn switch is detected, said sound generation device to generate horn sound.

6. The vehicle approach notification control apparatus for an electric motorcycle according to claim 1, wherein:

said sound generation device is a speaker provided on the vehicle body rear side of a front cover, which covers a head pipe of a vehicle body frame of said electric motorcycle from the front; and said control unit is disposed in the proximity of said speaker on the vehicle body rear side of said front cover.

7. The vehicle approach notification control apparatus for an electric motorcycle according to claim 6, wherein:

said vehicle approach notification control apparatus further includes a notification sound switch for switching operation of said control unit on or off;

said notification sound switch is configured integrally with said speaker; and an operation element for operating said notification sound switch so as to be projected and retracted is configured so as to be exposed rearwardly of the vehicle body from a through-hole formed in a leg shield, which covers the vehicle body rear side of said head pipe continuously to said front cover.

8. The vehicle approach notification control apparatus for an electric motorcycle according to claim 1, wherein:

said vehicle approach notification control apparatus further includes a control unit for controlling the notification sound; and said control unit is disposed on the inner side of said handle cover, which covers said steering handle member of said electric motorcycle, and in the proximity of a right side handle grip attached to one end portion of a handle bar of said steering handle member at a lower portion of said handle bar.

9. A vehicle approach notification control apparatus for an electric motorcycle, comprising:

a sound generation device configured to generate a notification sound of an engine driven motorcycle, in response to a motor speed of an electric motor or a vehicle speed; and a pseudo engine sound volume storage device configured to store sound volume data of engine sound of the engine driven motorcycle, wherein said sound generation device is controlled based on the sound volume data stored in said pseudo engine sound volume storage device wherein said vehicle approach notification control apparatus further includes a raindrop sensor for detecting a rain amount and an illuminance sensor for detecting brightness; and said vehicle approach notification control apparatus carries out, in the case where a rainfall state is detected by said raindrop sensor, correction for increasing the sound volume of said sound generation means, but carries out, in the case where it is detected by said illuminance sensor that it is nighttime, correction for decreasing the sound volume of said sound generation device.

10. The vehicle approach notification control apparatus for an electric motorcycle according to claim 9, wherein the pseudo engine sound volume data is set so that the sound volume decreases in response to an increase of the vehicle speed and becomes zero when a predetermined vehicle speed is reached.

11. The vehicle approach notification control apparatus for an electric motorcycle according to claim 9, wherein:

said electric motorcycle includes a centrifugal clutch provided on a driving route for driving a driving wheel from said electric motor; and said vehicle approach notification control apparatus controls said sound generation device in response to the motor speed in a state in which the vehicle speed is in the proximity of zero before the speed of said electric motor reaches a connection speed of said centrifugal clutch.

12. The vehicle approach notification control apparatus for an electric motorcycle according to claim 9, wherein the pseudo engine sound volume data is set so as to correspond to engine sound of a maximum total stroke volume of an engine driven vehicle of a vehicle category that is the same as the vehicle category of said electric motorcycle.

13. The vehicle approach notification control apparatus for an electric motorcycle according to claim 9, wherein:

said vehicle approach notification control apparatus further includes a control unit for controlling the notification sound; and said control unit is connected to a horn switch provided on a handle cover, which covers a steering handle member, of said electric motorcycle, and causes, if a switching on operation of said horn switch is detected, said sound generation device to generate horn sound.

14. The vehicle approach notification control apparatus for an electric motorcycle according to claim 9, wherein:

said sound generation device is a speaker provided on the vehicle body rear side of a front cover, which covers a head pipe of a vehicle body frame of said electric motorcycle from the front; and said control unit is disposed in the proximity of said speaker on the vehicle body rear side of said front cover.

15. The vehicle approach notification control apparatus for an electric motorcycle according to claim 14, wherein:

said vehicle approach notification control apparatus further includes a notification sound switch for switching operation of said control unit on or off;

said notification sound switch is configured integrally with said speaker; and an operation element for operating said notification sound switch so as to be projected and retracted is configured so as to be exposed rearwardly of the vehicle body from a through-hole formed in a leg shield, which covers the vehicle body rear side of said head pipe continuously to said front cover.

16. The vehicle approach notification control apparatus for an electric motorcycle according to claim 9, wherein:

said vehicle approach notification control apparatus further includes a control unit for controlling the notification sound; and said control unit is disposed on the inner side of said handle cover, which covers said steering handle member of said electric motorcycle, and in the proximity of a right side handle grip attached to one end portion of a handle bar of said steering handle member at a lower portion of said handle bar.

* * * * *